(12) United States Patent
Kaneda

(10) Patent No.: US 11,520,534 B2
(45) Date of Patent: Dec. 6, 2022

(54) INFORMATION PROCESSING DEVICE, PRINTING DEVICE AND METHOD OF CONTROLLING THE SAME

(71) Applicant: CANON KABUSHIKI KAISHA, Tokyo (JP)

(72) Inventor: Takeshi Kaneda, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/316,790

(22) Filed: May 11, 2021

(65) Prior Publication Data

US 2021/0263688 A1 Aug. 26, 2021

Related U.S. Application Data

(63) Continuation of application No. 16/720,773, filed on Dec. 19, 2019, now Pat. No. 11,099,793, which is a continuation of application No. PCT/JP2018/017915, filed on May 9, 2018.

(30) Foreign Application Priority Data

Jun. 27, 2017 (JP) .............................. JP2017-125594
Oct. 12, 2017 (JP) .............................. JP2017-198755

(51) Int. Cl.
*G06F 15/00* (2006.01)
*G06F 3/12* (2006.01)
*G06K 1/00* (2006.01)

(52) U.S. Cl.
CPC .......... *G06F 3/1204* (2013.01); *G06F 3/1226* (2013.01); *G06F 3/1258* (2013.01)

(58) Field of Classification Search
CPC ..... G06F 3/1204; G06F 3/1226; G06F 3/1258
USPC ............................. 358/1.15, 1.14, 1.13, 1.1
See application file for complete search history.

(56) References Cited

U.S. PATENT DOCUMENTS

| 8,334,988 | B2 | 12/2012 | Sekine |
| 8,446,613 | B2 | 5/2013 | Kujirai |
| 8,605,316 | B2 | 12/2013 | Mori |
| 8,659,776 | B2 | 2/2014 | Nakamura |

(Continued)

FOREIGN PATENT DOCUMENTS

| CN | 101247454 A | 8/2008 |
| CN | 102253814 A | 11/2011 |

(Continued)

OTHER PUBLICATIONS

Japanese Office Action dated Jun. 11, 2021, in Japanese Patent Application No. 2017-198755.

(Continued)

*Primary Examiner* — Douglas Q Tran
(74) *Attorney, Agent, or Firm* — Venable LLP

(57) ABSTRACT

The printing device registers setting information pertaining to printing and sends identification information of the registered setting information registered to an information processing device in response to an obtainment request from the information processing device. When a print job including the identification information is received from the information processing device, the printing device executes the print job having applied the setting information corresponding to the identification information to print settings of the print job.

20 Claims, 20 Drawing Sheets

(56) References Cited

U.S. PATENT DOCUMENTS

| | | |
|---|---|---|
| 8,699,074 B2 | 4/2014 | Kijurai |
| 9,065,939 B2 | 6/2015 | Tanaka |
| 9,372,648 B2 | 6/2016 | Nakajima et al. |
| 9,607,250 B2 | 3/2017 | Nakagawa |
| 10,504,014 B2 | 12/2019 | Kaneda |
| 2001/0006423 A1 | 7/2001 | Subramaniam |
| 2009/0303528 A1 | 12/2009 | Takeuchi et al. |
| 2010/0165397 A1* | 7/2010 | Yamada ............... G06F 3/1285 358/1.15 |
| 2012/0038948 A1 | 2/2012 | Park |
| 2012/0140272 A1 | 6/2012 | Funame |
| 2012/0212763 A1 | 8/2012 | Honma |
| 2012/0268769 A1 | 10/2012 | Kashioka |
| 2013/0135668 A1 | 5/2013 | Minagawa |
| 2013/0141747 A1 | 6/2013 | Oba et al. |
| 2014/0085653 A1* | 3/2014 | Imagawa ............. G06F 3/1257 358/1.13 |
| 2014/0118776 A1 | 5/2014 | Lee |
| 2014/0211138 A1 | 7/2014 | Kaneoya et al. |
| 2014/0300931 A1 | 10/2014 | Honma |
| 2015/0036188 A1 | 2/2015 | Miyake et al. |
| 2015/0286451 A1 | 10/2015 | Armstrong et al. |
| 2016/0092144 A1 | 3/2016 | Sato |
| 2016/0246551 A1* | 8/2016 | Ichikawa ............. G06F 9/4411 |
| 2018/0174004 A1 | 6/2018 | Kaneda |
| 2019/0251406 A1 | 8/2019 | Honma |
| 2019/0303054 A1 | 10/2019 | Kaneda |
| 2020/0274987 A1 | 8/2020 | Matsuda |

FOREIGN PATENT DOCUMENTS

| | | |
|---|---|---|
| CN | 102385490 A | 3/2012 |
| CN | 102566947 A | 7/2012 |
| CN | 103312917 A | 9/2013 |
| CN | 103631543 A | 3/2014 |
| JP | H08-335149 A | 12/1996 |
| JP | 2006-344081 A | 12/2006 |
| JP | 2009296474 A | 12/2009 |
| JP | 2012-173805 A | 9/2012 |
| JP | 2013187571 A | 9/2013 |
| JP | 2014089714 A | 5/2014 |
| JP | 2014164421 A | 9/2014 |
| JP | 2014219784 A | 11/2014 |
| JP | 2015032027 A | 2/2015 |
| JP | 2016068312 A | 5/2016 |
| KR | 10-2006-0113787 A | 11/2006 |

OTHER PUBLICATIONS

Korean Office Action dated Jun. 16, 2021, in Korean Patent Application No. 10-2019-7038310.

International Search Report issued in corresponding parent International Application No. PCT/JP2018/017915 dated Jul. 17, 2018.

Chinese Office Action dated Dec. 30, 2020, in related Chinese Patent Application No. 201880043851.0 (with English translation).

European Search Report dated Feb. 3, 2021, in related European Patent Application No. 18824198.8.

* cited by examiner

| PRESET IDENTIFIER (PRESET NAME) | OWNER IDENTIFIER (OWNER NAME) | COLOR PRINTING | | PRINTED SIDES | | Nup | | | | | | |
|---|---|---|---|---|---|---|---|---|---|---|---|---|
| | | CL | BW | SINGLE-SIDED | DOUBLE-SIDED | 1in1 | 2in1 | 4in1 | 6in1 | 8in1 | 12in1 | 16in1 |
| ESTIMATE FORM | suzuki | ● | | ● | | ● | | | | | | |
| APPLICATION FORM | suzuki | | ● | | ● | | ● | | | | | |
| ACCOUNTING | sato | | ● | ● | | ● | | | | | | |
| DIAGRAM | suzuki | | ● | ● | | ● | | | | | | |
| CATALOG | guest | ● | | ● | | | | | | | | ● |
| DM | guest | | ● | | ● | ● | | | | | | |

| BINDING 508 | | | | | | | | | | |
|---|---|---|---|---|---|---|---|---|---|---|
| STAPLING | | | | | | | | STAPLELESS BINDING | | NONE |
| ONE POINT | | | TWO POINTS | | | | ONE POINT | | | |
| UPPER-LEFT | LOWER-LEFT | UPPER-RIGHT | LEFT | LOWER | RIGHT | UPPER | UPPER-LEFT | LOWER-LEFT | LOWER-RIGHT | UPPER-RIGHT | |
| ● | | | | | | | | | | | |
| | | | ● | | | | | | | | |
| | | | | | | | ● | | | | |
| | | | | | | | | | | | ● |
| | | | | | | | | | | | ● |
| | | | | | | | | | | | ● |

FIG. 6A

```
"Get-Printer-Attributes";                  ⌐600
RequestAttributes = (
    {
        "attributes-charset" = "utf-8";
        "attributes-natural-language" = en;
        "printer-uri" = "ipp://xxxx.local:631/ipp/print";
        "printer-preset-owner" = "suzuki";
    }          ⌐601
);
```

```
RequestId = 123456;                          ⌐610
ResponseAttributes = (
  {
    "attributes-charset" = "utf-8";
    "attributes-natural-language" = "ja-jp";
  },
  {
    "charset-configured" = "utf-8";
    "charset-supported" = "utf-8";
    "color-mode-default" = default;
    "color-mode-supported" = (
      default,
      mono,
      color
    );
    "color-supported" = 1;
    "compression-supported" = none;
    "copies-default" = 1;
    "copies-supported" =       {
      lower = 1;
      upper = 9999;
    };
    "document-format-default" = "application/octet-stream";
    "document-format-preferred" = "application/pdf";

<abbreviation>
                                             ⌐611
       "print-preset-list" = [
       "print-preset" = (
         "name" = "estimate form"; ⌐612
         "owner" = "suzuki"
       ),            ⌐613
       "print-preset" = (
         "name" = "application form",
         "owner" = "suzuki"
       ),
       "print-preset" = (
         "name" = "diagram",
         "owner" = "suzuki"
       )
       ]

<abbreviation>

```
"Create-Job" ;                                              ~620
   OperationAttributes =   (
        {
         "attributes-charset" = "utf-8";
         "attributes-natural-language" = en;
         "printer-uri" = "ipp://xxxx.local.:631/ipp/print";
         "requesting-user-name" = "suzuki"

}
   );

JobAttributes = (
        "output-bin" = "auto"

<abbreviation>

"user-select-preset" = (
                 "name" = "estimate form";~621
                 "owner" = "suzuki"
             )                          \622

<abbreviation>

PRESET REGISTRATION (2)

| PRINTING MODE | PLEASE SELECT PRINTING MODE |
| --- | --- |
| PRINTED SIDES | ◉ COLOR PRINTING |
| Nup | |
| BINDING | ○ BLACK-AND-WHITE PRINTING |
| PUNCHING | |
| FOLDING | |

[ CANCEL ]  [ SAVE ]

PRESET REGISTRATION (2)

| PRINTING MODE | PLEASE SELECT PRINTED SIDES |
| --- | --- |
| PRINTED SIDES | ◉ SINGLE-SIDED |
| Nup | |
| BINDING | ○ DOUBLE-SIDED |
| PUNCHING | |
| FOLDING | |

[ CANCEL ]  [ SAVE ]

PRESET REGISTRATION (2)

- PRINTING MODE
- PRINTED SIDES
- Nup (751)
- BINDING
- PUNCHING
- FOLDING

PLEASE SELECT NUMBER OF Nup
- ◉ NONE (1up)
- ○ 2up
- ○ 3up
- ○ 4up
- ○ 6up
- ○ 8up
- ○ 12up
- ○ 16up

[CANCEL] [SAVE] (732)

PRESET REGISTRATION (2)

- PRINTING MODE
- PRINTED SIDES
- Nup
- BINDING (761)
- PUNCHING
- FOLDING

PLEASE SELECT BINDING TYPE
- ◉ NONE
- ○ STAPLING
- ○ STAPLELESS BINDING

PLEASE SELECT BINDING POSITION
- ◉ UPPER-LEFT
- ○ LOWER-LEFT
- ○ UPPER-RIGHT
- ○ LOWER-RIGHT

○ LEFT ○ LOWER ○ RIGHT ○ UPPER (ONE POINT BINDING)
(TWO POINTS BINDING)

[CANCEL] [SAVE] (732)

PRESET REGISTRATION (2)

| | |
|---|---|
| PRINTING MODE | PLEASE SELECT NUMBER OF HOLES |
| PRINTED SIDES | ◉ NONE  ○ TWO HOLES  ○ THREE HOLES  ○ FOUR HOLES  ○ MANY HOLES |
| Nup | |
| BINDING | PLEASE SELECT POSITION |
| PUNCHING | ○ LEFT  ○ LOWER  ○ RIGHT  ○ UPPER |
| FOLDING | |

[ CANCEL ]  [ SAVE ]

FIG. 7G

PRESET REGISTRATION (2)

| | |
|---|---|
| PRINTING MODE | ◉ NONE |
| PRINTED SIDES | ○ Engineering-Z |
| Nup | |
| BINDING | ○ TWO-HOLDING  ○ Z-HOLDING |
| PUNCHING | |
| FOLDING | ○ THREE-HOLDING |

[ CANCEL ]  [ SAVE ]

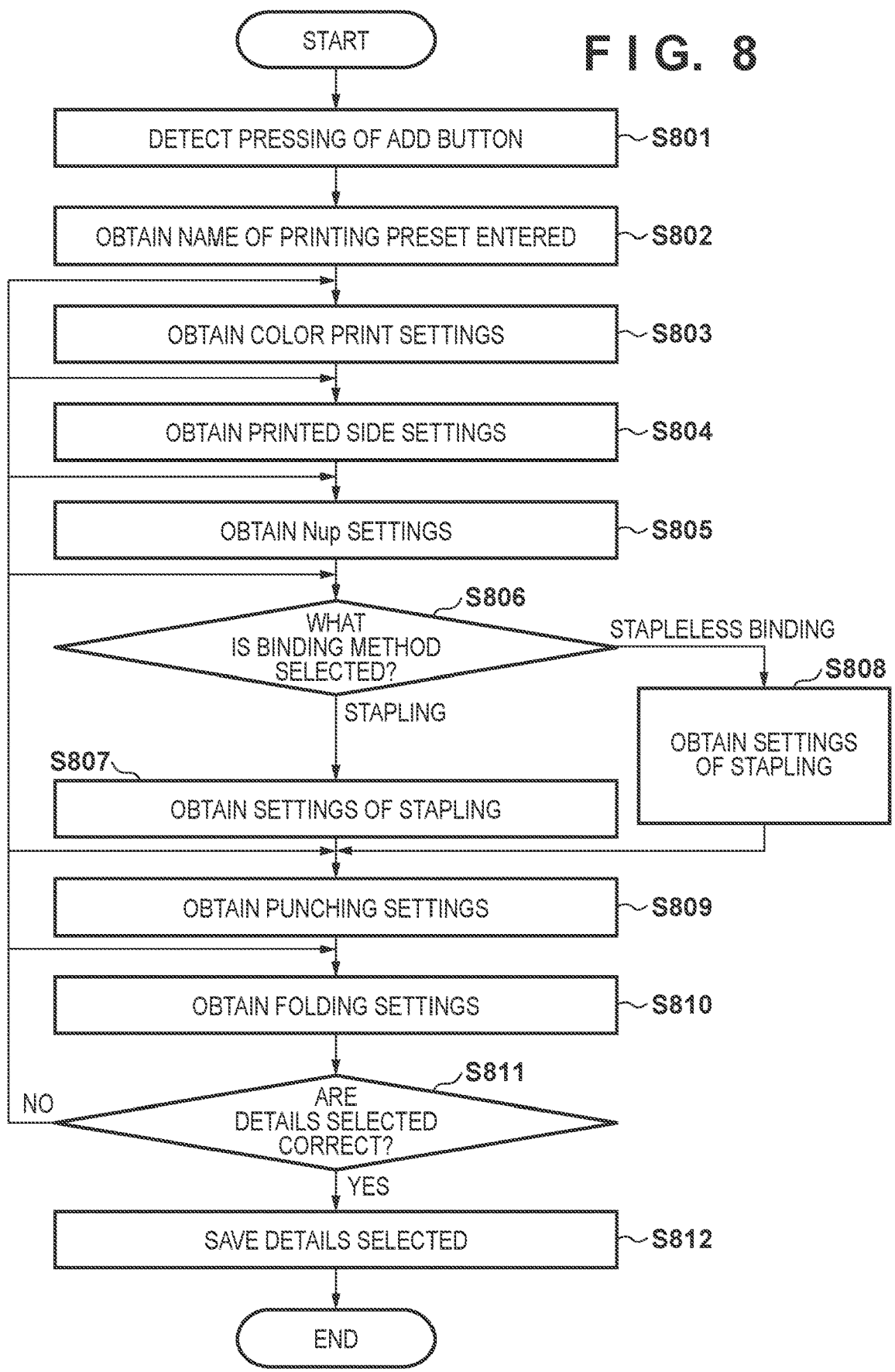

INFORMATION PROCESSING DEVICE, PRINTING DEVICE AND METHOD OF CONTROLLING THE SAME

This application is a continuation of application Ser. No. 16/720,773, filed Dec. 19, 2019.

CROSS-REFERENCE TO RELATED APPLICATIONS

This application is a Continuation of International Patent Application No. PCT/JP2018/017915 filed May 9, 2018, which claims the benefit of Japanese Patent Application No. 2017-125594, filed Jun. 27, 2017, and Japanese Patent Application No. 2017-198755, filed Oct. 12, 2017, which are hereby incorporated by reference herein in their entirety.

BACKGROUND OF THE INVENTION

Field of the Invention

The present invention relates to an information processing device, a printing device and a method of controlling the same.

Background Art

There are printing devices which are connected to a network, and which receive data from an information processing device over the network and print the data. Additionally, an information processing device generating print data to be sent to a printing device, by using a printer driver (or printing application) designed to use individual printing devices, has been known for some time.

In recent years, information processing devices generating print data without using a printer driver (or printing application) designed to use individual printing devices are known. For example, print data is generated by a generic printing service provided as a function of the operating system (OS) of the information processing device, a generic printing service provided by a print server or the like in the cloud, or the like, and that data is then sent to a printing device. With such a generic printing service, a network protocol for executing printing having sent print data to a printing device (Internet Printing Protocol; IPP) is provided, and the printing process is realized by communication between the printing device and the information processing device according to that protocol.

For example, PTL 1 discloses searching out nearby MFPs through NFC communication and displaying a list of discovered MFPs in a screen of a mobile communication terminal device upon an image being selected and designated for printing through that screen. A protocol suited to the sending of image data is then selected on the basis of protocol information from the selected MFP, and image data for printing is then sent.

It is desirable that a print server, an information processing device, or the like that provides a generic printing service compliant with a standard such as IPP being capable of handling a variety of types of printing devices. Thus to handle different functions, specifications, and so on from printing device to printing device, it is necessary for the information processing device which uses the generic printing service to manage configuration information for the printing devices.

CITATION LIST

Patent Literature

PTL 1: Japanese Patent Laid-Open No. 2013-187571

When the information processing device generates print data using a generic printing service such as IPP, the print data is generated on the basis of the configuration information of the printing device. However, with a generic printing service, in order to handle a variety of printing devices, print settings are made through a print job settings screen that is made common for different types of printing devices. It is therefore not necessarily the case that the user will be able to make the print settings s/he wishes to use. In particular, there are situations where the finishing processes or the like provided individually by printer vendors (e.g., unique region-specific puncher standards and folding process standards, special binding process standards) cannot be set through the print settings screen provided by a generic printing service. Thus even if a function has been successfully provided to a user through a printer driver (or printing application) designed to be used with various printing devices, there is a possibility of that the function cannot be used if the printing device is used through a generic printing service. Furthermore, for functions such as making favorite print settings used in routine tasks, which are provided by conventional printer drivers or the like, there is a possibility of that those functions cannot be used if the printing device is used through a generic printing service.

An object of the present invention is to solve at least one of the above-described problems with the conventional techniques.

An object of the present invention is to provide a technique that improves the convenience when printing through a generic printing service.

SUMMARY OF THE INVENTION

In order to achieve the above object, a printing device according to one aspect of the present invention has the following configuration. That is, the printing device includes: a registering unit configured to register setting information pertaining to printing; a sending unit configured to send identification information of the setting information registered by the registering unit to an information processing device as a response to an obtainment request from the information processing device; and a printing control unit configured to, upon a print job including the identification information being received from the information processing device, print the print job having applied the setting information corresponding to the identification information to print settings of the print job.

Further features of the present invention will become apparent from the following description of exemplary embodiments with reference to the attached drawings.

BRIEF DESCRIPTION OF THE DRAWINGS

The accompanying drawings, which are included in and constitute part of the specification, illustrate embodiments of the present invention, and along with those descriptions serve to illustrate the principles of the present invention.

FIG. 5A is a diagram for describing a specific example of a management table for printing presets, saved in a printing preset saving module of the MFP, according to the first embodiment.

FIG. 5B is a diagram for describing a specific example of the management table for printing presets, saved in the printing preset saving module of the MFP, according to the first embodiment.

FIG. 6A is a diagram for describing an example of a request to obtain capability information of the printer and information pertaining to a printing preset identifier, and a response thereto, between the information processing device and the MFP according to the first embodiment.

FIG. 6B is a diagram for describing an example of data in a print job generated by the information processing device and sent to the MFP according to the first embodiment.

FIG. 7B is a diagram for describing an example of a UI screen when registering a printing preset in the MFP according to the first embodiment.

FIG. 7C is a diagram for describing an example of a UI screen when registering a printing preset in the MFP according to the first embodiment.

FIG. 7D is a diagram for describing an example of a UI screen when registering a printing preset in the MFP according to the first embodiment.

FIG. 7E is a diagram for describing an example of a UI screen when registering a printing preset in the MFP according to the first embodiment.

FIG. 7F is a diagram for describing an example of a UI screen when registering a printing preset in the MFP according to the first embodiment.

FIG. 7G is a diagram for describing an example of a UI screen when registering a printing preset in the MFP according to the first embodiment.

FIG. 8 is a flowchart for describing processing by the MFP through which a user of the information processing device manipulates the UI screens in FIGS. 7A to 7H and saves printing presets input to the MFP.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
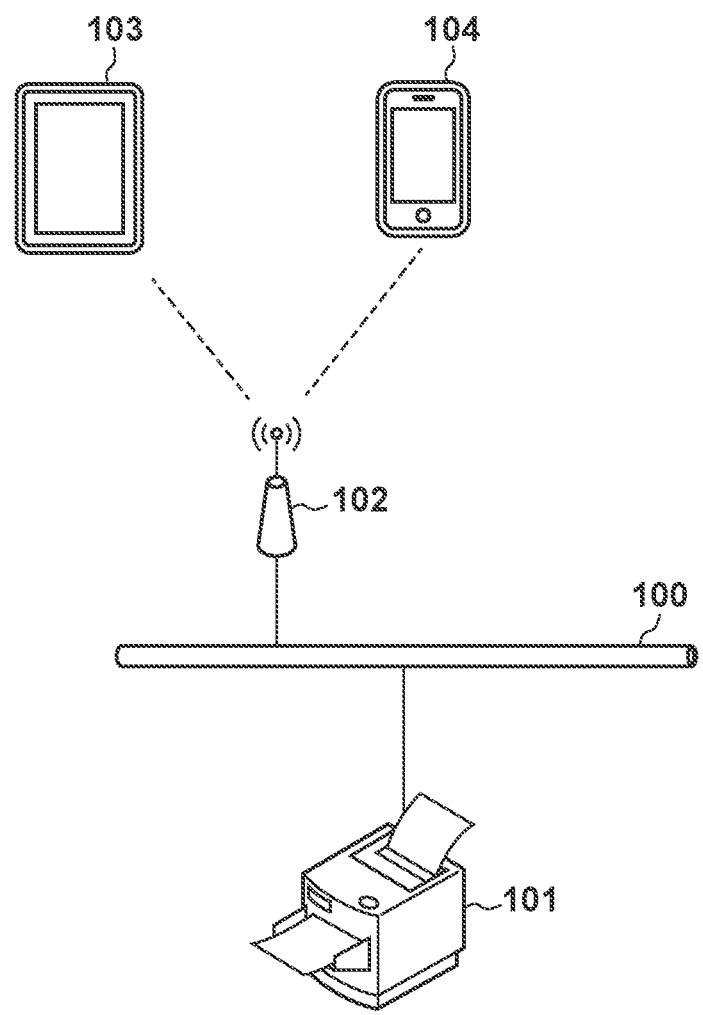
FIG. 1 is a diagram for describing the configuration of a printing system according to a first embodiment of the present invention.

FIG. 1 is a block diagram for describing the configuration of a printing system according to a first embodiment of the present invention.

A multifunction peripheral (MFP) 101 and an access point (AP) 102 are connected to a LAN (Local Area Network) 100 so as to be capable of communicating with each other. In the first embodiment, an MFP 101 having a scan function, a printing function, a fax sending/receiving function, a box function, and the like will be described as an example of a printing device. Meanwhile, mobile terminals 103 and 104, which are tablets, smartphones, or the like, will be described as examples of information processing devices. Note that in the following descriptions, the tablet 103, the smartphone 104, and the like are collectively referred to as "information processing devices". The information processing devices can communicate with the MFP 101 over the LAN 100 via the AP 102. Although the first embodiment describes the foregoing exemplary configuration as an example of the printing system, the present invention is not limited thereto, as long as at least one or more information processing devices and a printing device are communicatively connected over a network. Additionally, the network may be wireless or wired.

First, the MFP 101 will be described. The MFP 101 has a reading function for reading images on a document, and a printing function for printing images onto a sheet (a recording medium). The MFP 101 can execute a printing process on the basis of print data received over the network.

Figure 2:
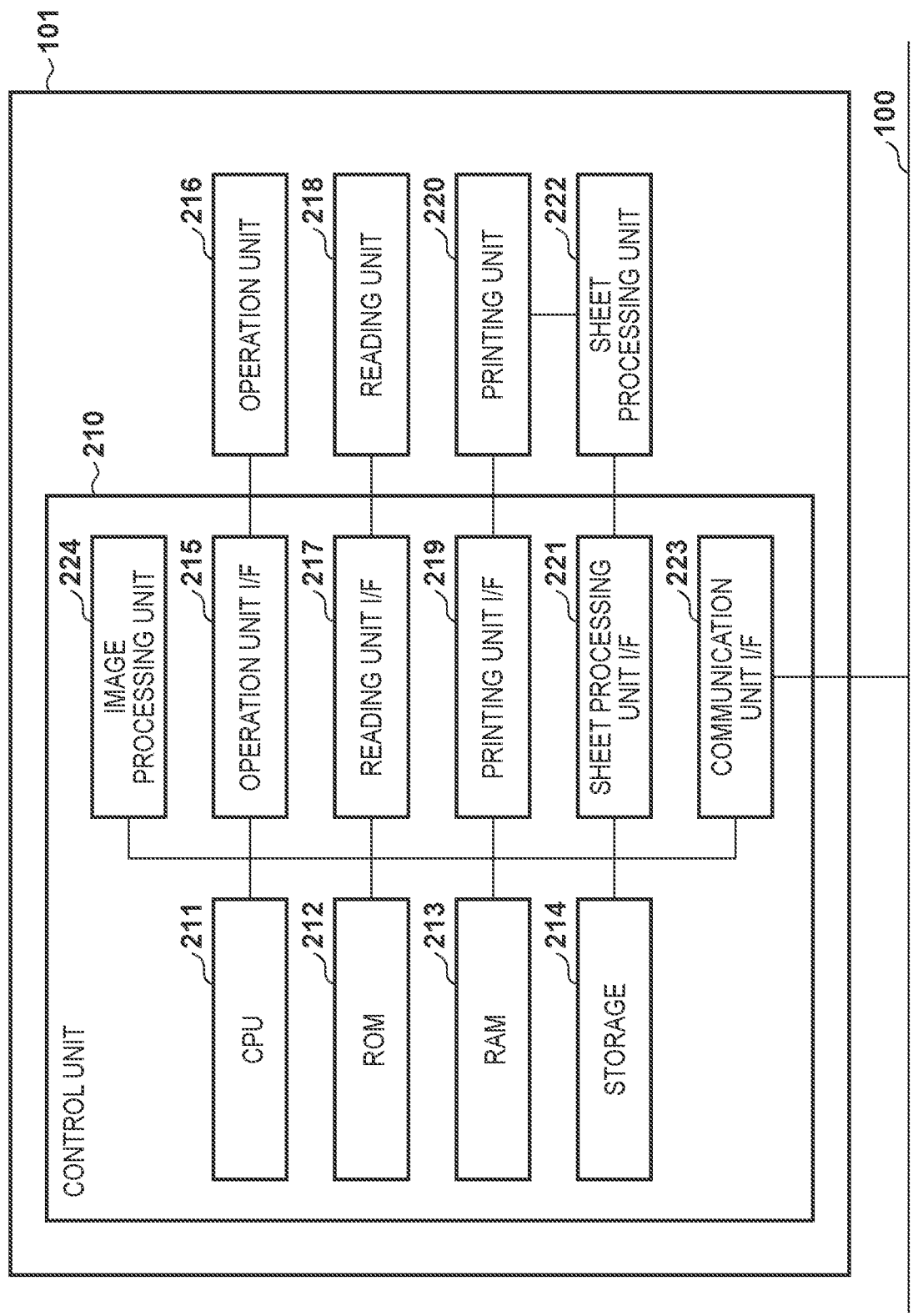
FIG. 2 is a block diagram for describing the hardware configuration of an MFP according to the first embodiment.

FIG. 2 is a block diagram for describing the hardware configuration of the MFP 101 according to the first embodiment.

The MFP 101 has the reading function for reading images on a sheet, and a printing function for printing images onto a sheet. The MFP 101 also has a file sending function for sending images to an external information processing device, and so on. Although the first embodiment describes the MFP 101 as an example of the printing device, the printing device is not limited thereto. For example, an SFP (Single Function Peripheral) or the like, which does not have a reading function, may serve as the printing device.

A control unit 210, which includes a CPU (Central Processing Unit) 211, controls the overall operations of the MFP 101. The CPU 211 carries out various types of control, such as printing control and reading control, by deploying programs stored in ROM (Read Only Memory) 212 or storage 214 into RAM 213 and executing those deployed programs. The ROM 212 stores control programs, a boot program, and the like that can be executed by the CPU 211. The RAM (Random Access Memory) 213 is the main storage memory of the CPU 211, and provides as a work area or a temporary storage region for deploying various types of control programs. The storage 214 stores print data, image data, various types of programs, and various types of setting information. Although the present first embodiment assumes that the storage 214 is an auxiliary storage device such as an HDD (Hard Disk Drive) or the like, non-volatile memory such as an SSD (Solid State Drive) may be used as well.

Note also that with the MFP 101 according to the first embodiment, it is assumed that the single CPU 211 executes the respective processes in the flowcharts described later using a single memory (the RAM 213), but another format may be used as well. For example, the respective processes shown by the flowcharts described later may be executed with a plurality of CPUs, RAM, ROM, and storage operating in tandem. Some of the processes may be executed using hardware circuits such as an ASIC (Application Specific Integrated Circuit), an FPGA (Field-Programmable Gate Array), or the like.

An operation unit interface (I/F) 215 connects an operation unit 216 to the control unit 210. The operation unit 216 includes a display unit, which has touch panel functionality, various types of physical keys, and the like, and functions as a display unit that displays information, an accepting unit that accepts user instructions, and the like. A reading unit I/F 217 connects a reading unit (scanner) 218 to the control unit 210. The reading unit 218 generates image data by reading a document. Note that the generated image data is stored in the storage 214 or the RAM 213. Additionally, the image data generated by the reading unit 218 is sent to the information processing devices, used to print an image onto a sheet, or the like. A printing unit I/F 219 connects a printing unit (a printer engine) 220 to the control unit 210. Image data, which has been generated by analyzing a print job received from an information processing device, is transferred from the control unit 210 to the printing unit 220 via the printing unit I/F 219. The printing unit 220 receives control commands and a print job to be printed from the control unit 210, and on the basis of that print job, prints an image onto a sheet transported from a paper feed cassette (not shown). Note that the printing method of the printing unit 220 may be an electrophotographic method, or may be an ink jet method. Another printing method can be applied as well, such as a thermal transfer method. The control unit 210 is also connected to the LAN 100 via a communication unit I/F 223. The communication unit I/F 223 sends image data, information, and the like to the information processing devices on the LAN 100, receives print jobs, information, and the like from the information processing devices on the LAN 100, and so on.

An image processing unit 224 has a RIP (Raster Image Processor) function that expands a print job received over the LAN 100 and generates image data to be used in printing. The image processing unit 224 can also carry out resolution conversion, correction processing, and the like on the image data obtained by expanding the print job. Although the first embodiment assumes that the image processing unit 224 is realized by a hardware circuit (an ASIC, an FPGA, or the like), the image processing unit 224 is not limited thereto. For example, the MFP 101 may further include a processor for use in image processing, and the image processing, the process for expansion into print data, and the like may be realized by that processor executing an image processing program. In this case, the flowcharts described later are assumed to be realized by the processor and the CPU 211 working in tandem. Furthermore, the configuration may be such that a program for carrying out image processing is executed by the CPU 211, and image processing, the process for expansion into print data, and the like are carried out. The image processing may also be carried out by combining any of these.

A sheet processing unit I/F 221 connects the control unit 210 to a sheet processing unit 222. The sheet processing unit 222 receives control commands from the control unit 210, and in accordance with those control commands, carries out post-processing on the sheet that has been printed onto by the printing unit 220. For example, post-processing such as aligning a plurality of sheets, punching holes in a sheet, combining a plurality of sheets, and the like is executed. The sheet processing unit 222 according to the first embodiment can carry out two types of binding processes. One is a binding process that binds sheets using staples (stapling, hereinafter), and with this stapling, a plurality of sheets can be bound using staples. The other is a binding process that binds sheets without using staples (stapleless binding, hereinafter). In the stapleless binding process, a plurality of sheets are bound by pressing the plurality of sheets using a special blade, sheets are bound by punching holes in a plurality of sheets and bending the sheets back, or the like. The stapleless binding process does not require consumables such as staples, and thus the binding process can be carried out without worrying about the cost of such consumables. However, compared to the binding process that binds sheets using staples, the stapleless binding process has a lower upper limit on the number of sheets that can be bound (e.g., approximately 5 to 10 sheets). The post-processing functions, post-processing capabilities, and so on of the sheet processing unit 222 are communicated to the control unit 210 via the sheet processing unit I/F 221 in advance (e.g., when the MFP 101 is started up), and are stored in the storage 214 or the RAM 213.

Figure 3:
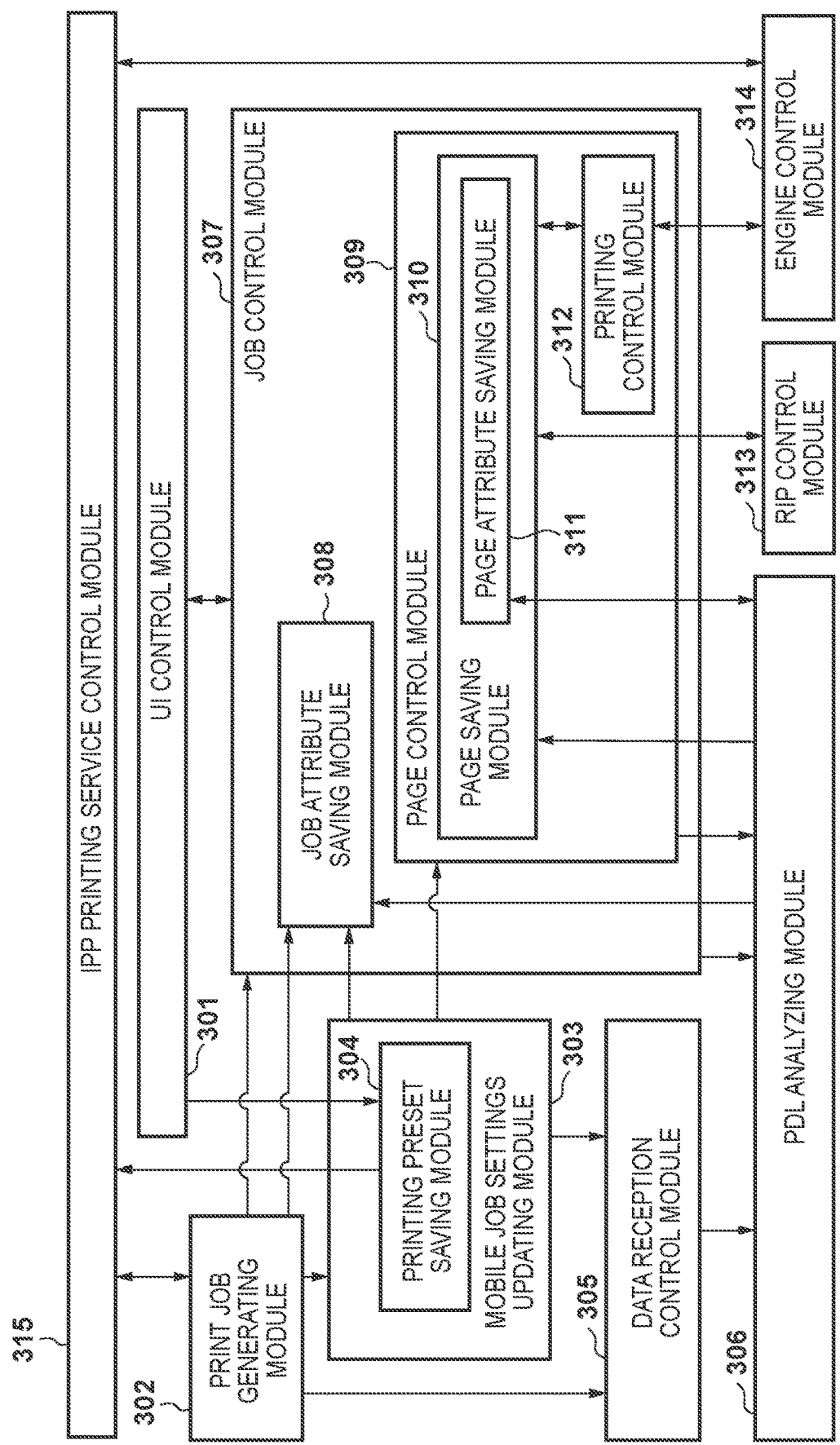
FIG. 3 is a function block diagram for describing the software configuration of an MFP according to the first embodiment.

FIG. 3 is a function block diagram for describing the software configuration of the MFP 101 according to the present first embodiment. Note that in the present first embodiment, it is assumed that the respective function modules illustrated in FIG. 3 are achieved by the CPU 211 executing programs that have been loaded into the RAM 213.

An IPP printing service control module 315 communicates, to the information processing devices, a search identifier for searching out printing presets saved in a printing preset saving module 304 and printer configuration information obtained from an engine control module 314 together as "printer information". The printing preset includes printing specifications such as color or black-and-white, single- or -double-sided, N-up, and the like, post-processing specifications such as binding, punching, or folding, and so on. The search identifier is an identifier of the user who registered the printing preset in the MFP 101 (owner identification information). The printer configuration information is function information of the printer (here, the MFP 101). When an MFP is shared among multiple people, several printing presets are registered in the MFP. When a printer search/capability obtainment request of that information processing device is received, the identifier of the printing preset to be communicated is searched out on the basis of the owner identification information of the information processing device included in the request. The matching printing preset is communicated to the information processing device that made the request. The method of communicating the printing preset extracted using the owner identification information is realized by an IPP printer search/response protocol. Furthermore, when a print job based on the IPP standard is received from an information processing device over the network, the IPP printing service control module 315 passes that print job to a print job generating module 302.

A UI control module 301 displays printing preset registration UI screens, which will be described later with reference to FIGS. 7A to 7H. After a user has logged in, the user can save desired printing preset information in the printing preset saving module 304, display, edit, and delete that information, and so on. The UI control module 301 obtains information pertaining to the state of a print job being processed from a job control module 307, and displays the processing state of the print job in the UI screen. The print job generating module 302 receives the print job from the information processing device through the IPP printing service control module 315 and writes the job into a data reception control module 305, and furthermore registers the job as a new job in the job control module 307 and requests the printing process to start. If the received print job is an IPP print job, the print job generating module 302 passes the print setting information to be applied to the print job to a job attribute saving module 308 through a mobile job settings updating module 303. Data of print jobs that are not IPP jobs is written directly into the job attribute saving module 308 by the print job generating module 302.

The mobile job settings updating module 303 is called through the print job generating module 302, and searches out the identifier of the printing preset included in the IPP header of the received print job. If the printing preset identifier is embedded in the IPP header, the data in the printing preset saving module 304 is searched using the identifier, and the printing preset corresponding to the identifier is obtained. Upon obtaining the corresponding print setting information from the printing preset identifier, the mobile job settings updating module 303 sets the obtained printing preset in the job attribute saving module 308.

The printing preset saving module 304 saves the printing presets set by the user of the information processing device through the UI screens illustrated in FIGS. 7A to 7H in the storage 214. If a saved printing preset has been updated, the details of that update are communicated to the IPP printing service control module 315. Upon receiving the notification of the printing preset update, the IPP printing service control module 315 communicates an update made to the printer information (the printing preset and the preset identifier) to the information processing devices on the network through the IPP protocol.

The data reception control module 305 is a buffer region for print jobs received from the print job generating module 302, and temporarily saves each print job in the storage 214. When the job control module 307 instructs a PDL analyzing module 306 to carry out a PDL analyzing process on the print job, the PDL analyzing module 306 makes a request for the print job to the data reception control module 305. As a result, the data reception control module 305 passes the data of the print job to the PDL analyzing module 306.

Upon receiving the registration of a print job from the print job generating module 302, the job control module 307 saves attribute information of that print job in the job attribute saving module 308. The job control module 307 also instructs the PDL analyzing module 306 to analyze the print job, and furthermore causes page data to be saved by a page control module 309 and a page attribute saving module 311 in units of pages. The page data created by the PDL analyzing module 306 is saved by the page control module 309 and the page attribute saving module 311 on a page-by-page basis, in sequence.

The job attribute saving module 308 saves the attribute information of the print job. The attribute information includes items set as IPP job attributes, such as a "number of copies", and items set on the basis of the printing preset, such as "Nup (collective printing)", "printed sides (single-sided/double-sided) settings", "color/black-and-white mode", and "finishing settings". The information further includes items set by the PDL analyzing module 306, such as information of text objects within the page. These are all managed by the job attribute saving module 308, in association with job IDs. The page control module 309 controls the page analysis process by the PDL analyzing module 306, a RIP process by a RIP control module 313, and a printing control process by a printing control module 312. The printing control module 312 obtains image data for which RIP is complete from a page saving module 310, separates the data into CMYK colors, and transfers the result to the engine control module 314. The engine control module 314 receives individual pieces of CMYK image data from the printing control module 312 in units of pages, and controls the printing unit 220 to carry out a printing process for each page.

Figure 4:
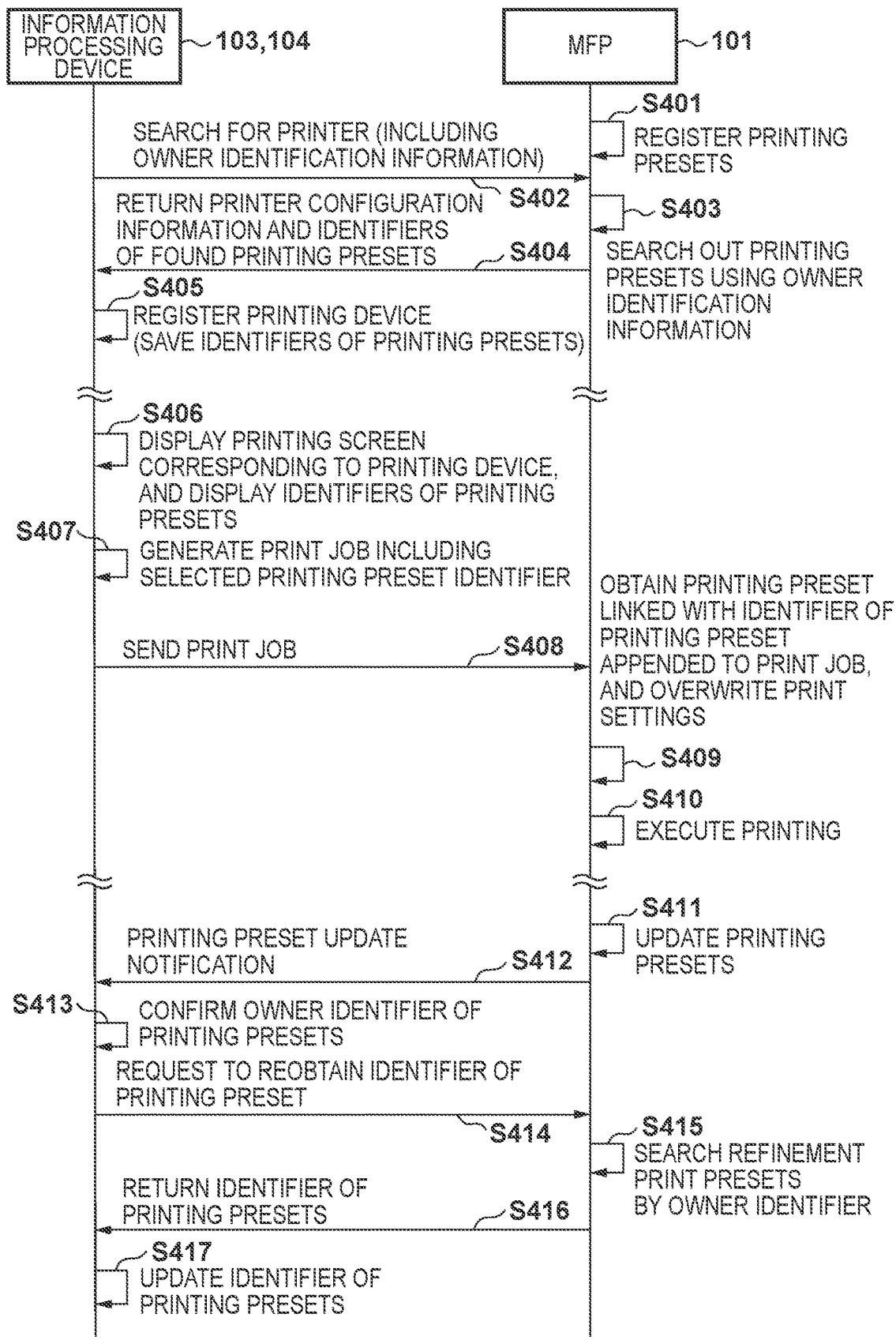
FIG. 4 is a sequence chart for describing a processing sequence for causing an MFP to print from an information processing device, in the printing system according to the first embodiment.
Figure 5C:
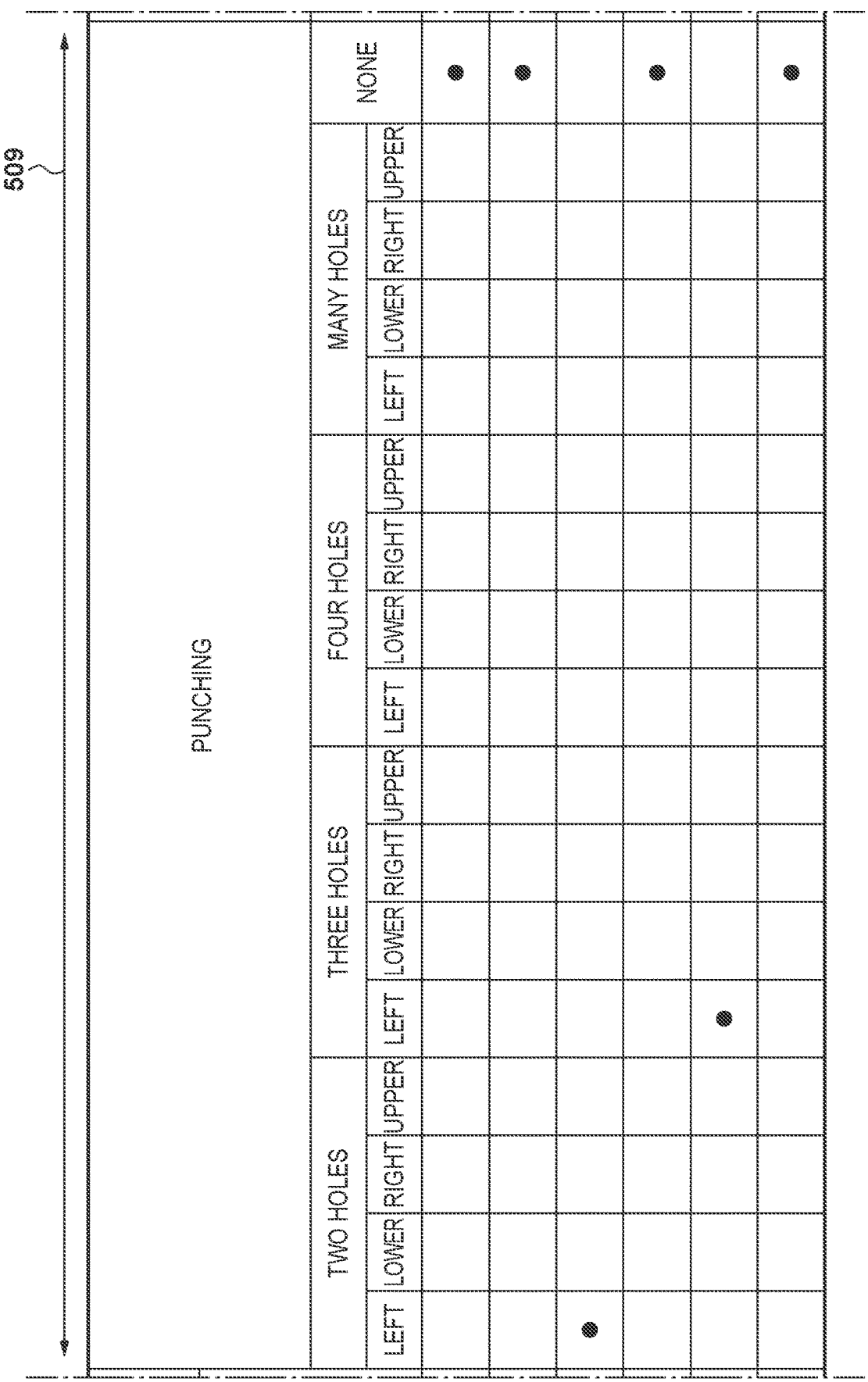
FIG. 5C is a diagram for describing a specific example of the management table for printing presets, saved in the printing preset saving module of the MFP, according to the first embodiment.
Figure 5D:
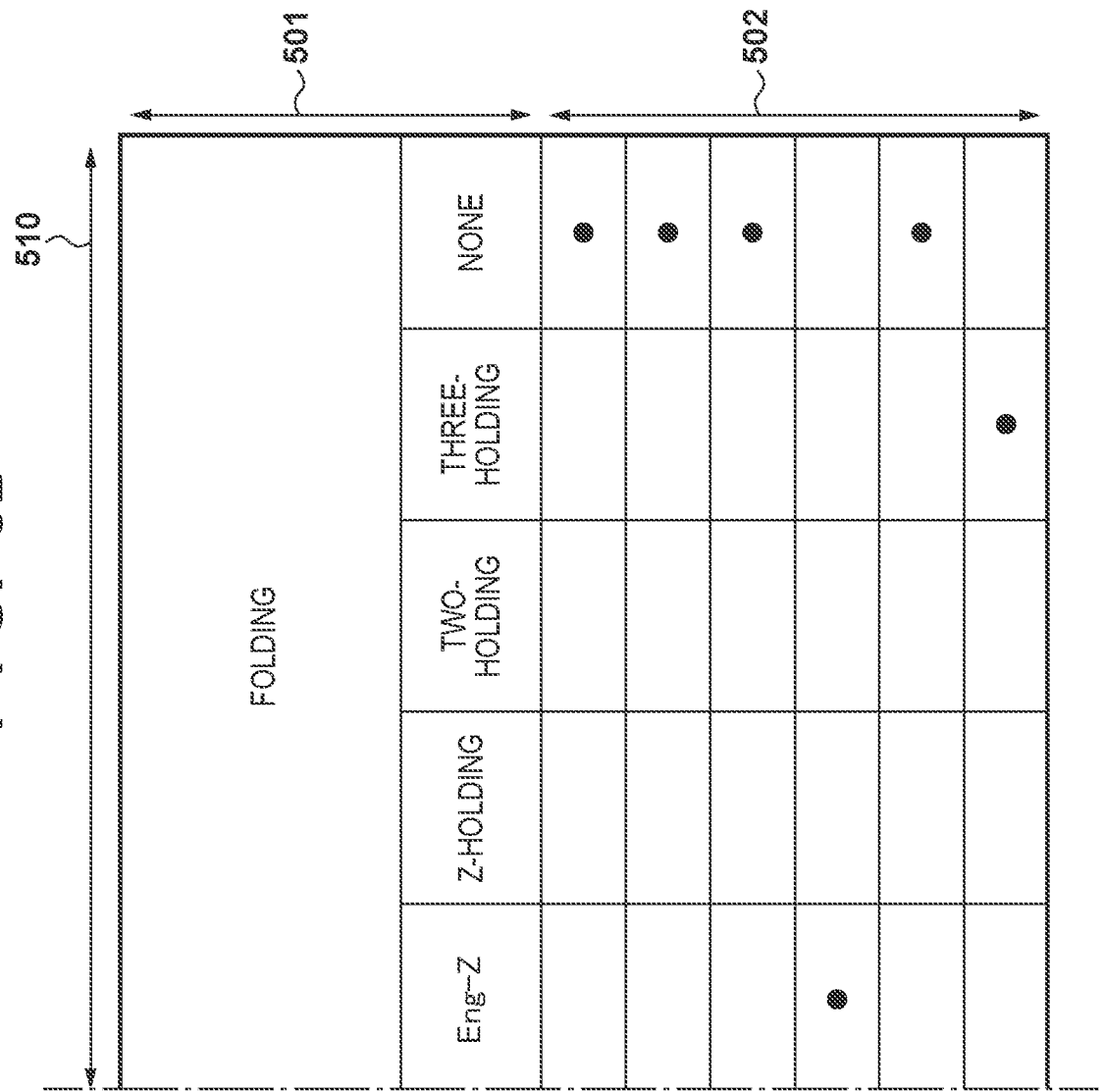
FIG. 5D is a diagram for describing a specific example of the management table for printing presets, saved in the printing preset saving module of the MFP, according to the first embodiment.

FIG. 4 is a sequence chart for describing a processing sequence carried out when causing the MFP 101 to print from an information processing device, in the printing system according to the present first embodiment.

In S401, the user of the information processing device registers printing presets through the UI screens (FIGS. 7A to 7H) of the operation unit 216 in the MFP 101. It is assumed that users can register individual printing presets in the MFP 101 according to the first embodiment. The details registered at that time are saved in the printing preset saving module 304 along with an owner name (the owner identification information) for identifying the user. The management tables in FIGS. 5A to 5D indicate specific examples of what is registered here.

After the registration, in S402, the user causes a printer search request to be sent from the information processing device using the IPP protocol. This search request includes the owner identification information (601, in FIG. 6A), which is the identifier of the user.

Upon receiving this search request, in S403, the MFP 101 searches out registered printing presets using the owner identification information included in the search request. Then, in S404, the MFP 101 returns the search result (the identifiers of printing presets matching the owner identification information) to the information processing device, along with the configuration information of the MFP 101 (610 in FIG. 6A), through the IPP protocol. As a result, in S405, the information processing device saves the identifiers of the individual printing presets for each user, and the printer configuration information, sent from the MFP 101 through the IPP protocol. Details of this will be given later with reference to FIGS. 6A and 6B.

Next, in S406, when the user of the information processing device displays a printing screen (901 in FIG. 9) in the information processing device, the identifier of the printing presets saved in S405 (921 in FIG. 9) are displayed in a printing dialog. The list of the printing preset identifiers differs from user to user. Details will be given later with reference to FIG. 9.

Figure 9:
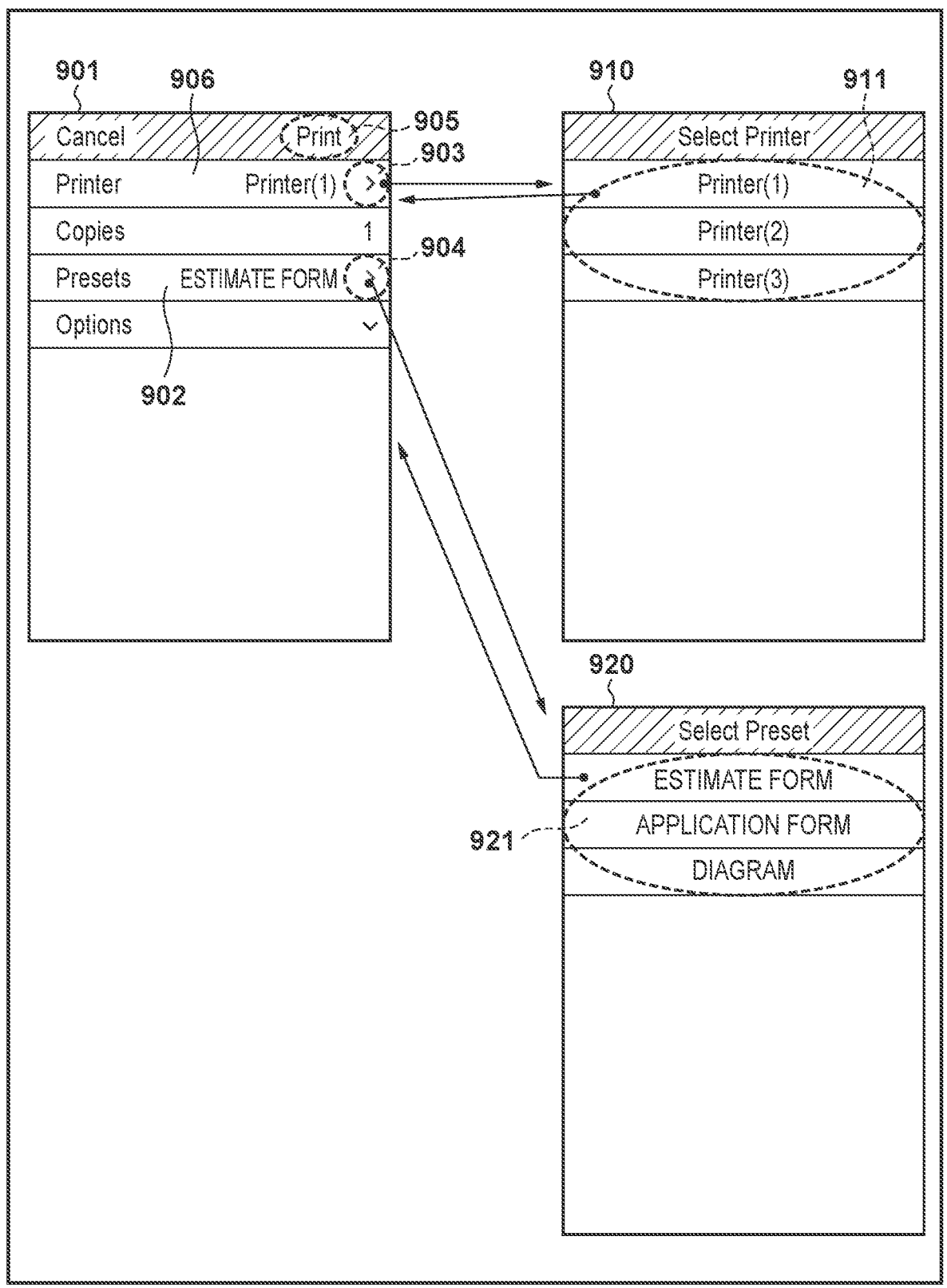
FIG. 9 is a diagram for describing an example of a print settings screen displayed by the information processing device according to the first embodiment.

Next, in S407, the user of the information processing device selects the identifier of a printing preset registered in the MFP 101 and presses a print button (905 in FIG. 9). As a result, in S408, the information processing device sends a print job, including a printing preset identifier, to the MFP 101.

Accordingly, in S409, the MFP 101 obtains the setting information of the printing presets registered in S401 from the printing preset identifier appended to the print job, and then requests the print settings of the print job in accordance with the setting information of the printing preset. Then, in S410, printing based on the print job is executed in accordance with those print settings.

S411 to S417 which follow thereafter indicate processing steps for a case where the user of the information processing device has updated the printing presets in the MFP 101 after a set amount of time. Upon detecting that the user has updated the printing presets in S411, in S412, the MFP 101 sends a printing preset update notification, including the owner identifier, to the information processing device. In S413, the information processing device compares the owner identification information in the updated printing presets with the owner information of the information processing device. If the owner identification information of the updated printing presets matches the owner information of the information processing device, the process advances to S414. If, however, the owner identification information of the updated printing presets does not match the owner information of the information processing device, the information processing device determines that the update is not directed at the information processing device itself, and therefore does not carry out a process for updating the printing presets.

Next, in S414, the information processing device sends, to the MFP 101, a request to obtain the printing preset identifier. This obtainment request includes the owner identifier of the information processing device. Having received the request to obtain the printing preset identifier, in S415, the MFP 101 searches out the printing presets corresponding to the owner identifier included in the request to obtain the printing presets. In S416, the MFP 101 sends, to the information processing device, the identifier of the printing presets corresponding to the owner identifier found through the search performed in S415. As a result, in S417, the information processing device updates the identifier of the printing presets stored as the print settings with the identifier of the printing presets received from the MFP 101.

When the printing presets are updated in the MFP 101 through the processing from S411 to S417 described above, the MFP 101 notifies the information processing device that the update has taken place. Then, upon determining that the updated printing presets are the printing presets it itself requires, the generic printing service of the information processing device can reobtain those printing presets.

FIGS. 5A to 5D are diagrams for describing a specific example of printing presets saved in the storage 214 by the printing preset saving module 304 of the MFP 101 according to the first embodiment.

501 denotes items which are printing preset identifiers, of "estimate form", "application form", "accounting", "diagram", "catalog", and "DM (direct mail)". 502 denotes printing resets corresponding to the owner identification information (owner name) of the person who registered the printing presets. If a user manipulates the UI screen in the operation unit 216 of the MFP 101 to register a single piece of preset information, one row's worth of data is saved in the management table.

In the example illustrated in FIGS. 5A to 5D, setting information such as color/black-and-white printing, printed sides (single-sided/double-sided), Nup, the presence/absence of binding (stapling, stapleless binding), punching, folding, and so on is included as printing presets. Furthermore, Nup includes the type thereof; binding includes the respective binding positions; punching includes the presence/absence of punching and the number of holes; and folding includes the presence/absence of folding, the type of the fold, and so on. Note that the settings indicated by 505 to 510 in FIGS. 5A to 5D are merely examples, and can be varied as appropriate on the basis of the printing capabilities and post-processing capabilities of the MFP 101. For example, a black-and-white MFP can be configured so that "color" cannot be registered as a printing preset.

FIGS. 7A to 7H are diagrams for describing examples of a UI screen when registering a printing preset in the MFP 101 according to the first embodiment. These screens are displayed in the screen of the operation unit 216 by the UI control module 301, and values set by the user are obtained through these screens.

Processing carried out when the user registers a printing preset in the MFP 101 will be described first. First, a login screen 700, in which the user presses a login button 712, is displayed in the operation unit 216, in a preset list screen 710, illustrated in FIG. 7A. In this screen, the user enters a username 701 and a password 702, and presses an OK button 703. When the information entered here matches information already registered in the MFP 101, the user can log into the MFP 101. After logging in, the user can add, edit, and delete printing presets and so on through the list screen 710. For the printing presets registered after the user has logged in, the logged-in user becomes the owner of those printing presets, and the printing presets can only be used from an information processing device by the owner. Note that the owner name of the printing presets is held in an owner identifier 504 in the table illustrated in FIGS. 5A to 5D.

FIG. 8 is a flowchart for describing processing by the MFP 101 through which the user of the information processing device manipulates the UI screens in FIGS. 7A to 7H and saves printing presets input to the MFP 101. Note that the processing indicated in this flowchart is achieved by the CPU 211 executing programs deployed into the RAM 213. Accordingly, the following descriptions of FIG. 8 assume that the CPU 211 is the entity executing each step.

The following will describe FIGS. 5A to 5D, FIGS. 7A to 7H, and FIG. 8 altogether, in sequence. The list screen 710 in FIG. 7A is a screen that displays a list of presets for print settings.

Figure 7A:
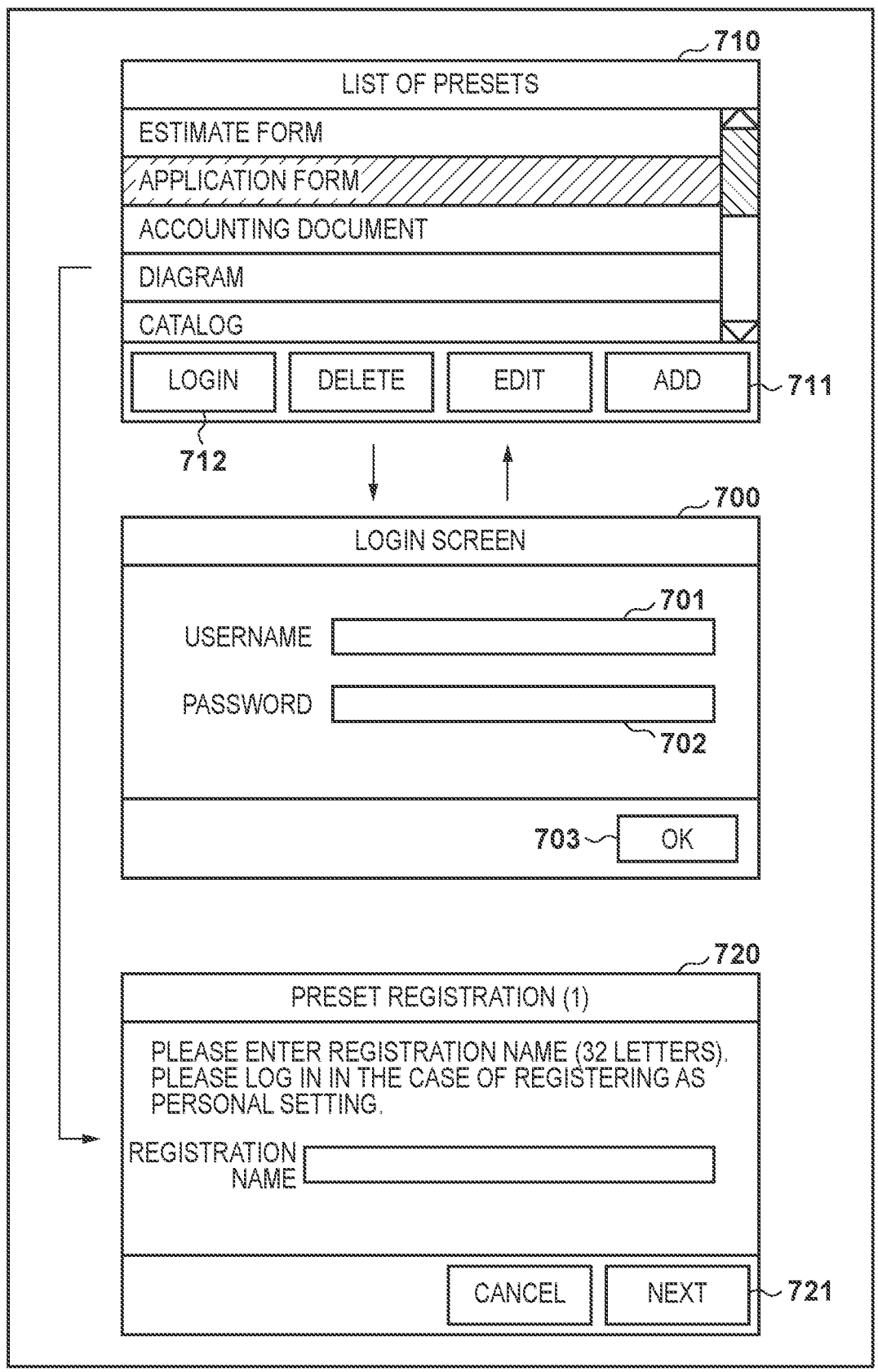
FIG. 7A is a diagram for describing an example of a UI screen when registering a printing preset in the MFP according to the first embodiment.
Figure 7H:
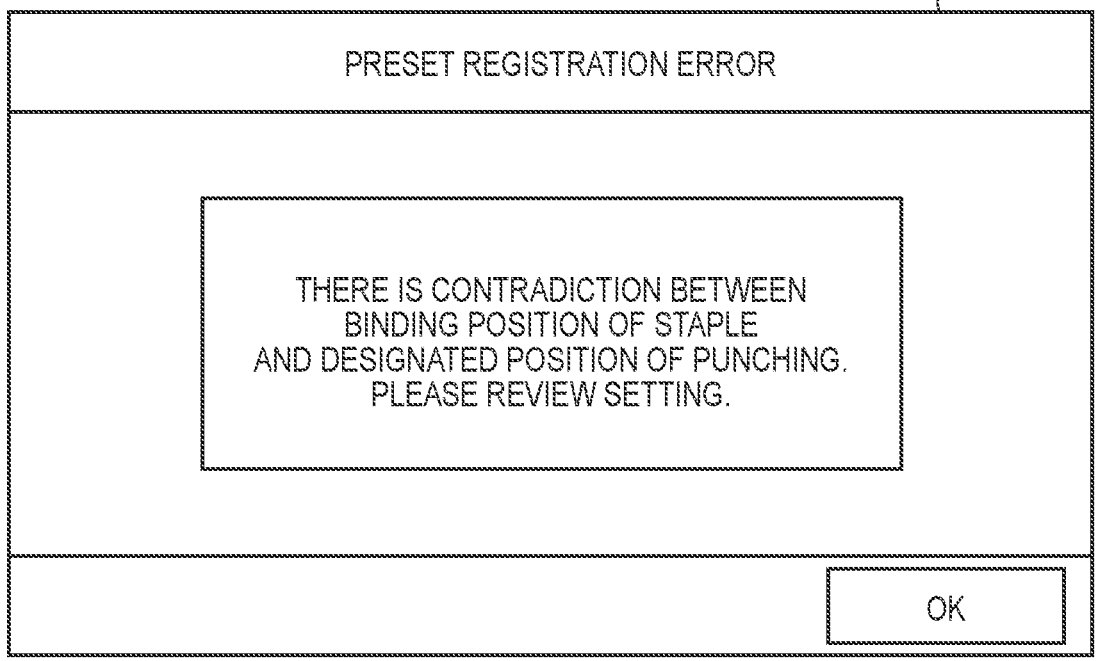
FIG. 7H is a diagram for describing an example of a UI screen when registering a printing preset in the MFP according to the first embodiment.

First, when the CPU 211 detects that the user has pressed an add button 711 in the list screen 710 in S801, the process advances to S802, where the CPU 211 displays a preset registration screen 720, illustrated in FIG. 7A, in the operation unit 216. This preset registration screen 720 is a screen for entering a "registration name", which serves as an identifier of a printing preset. In the case of a printing preset that is shared with all users, the user enters the registration name and presses the "next" button 721. The name of the printing preset entered through this preset registration screen 720 and user identification information of the login user respectively correspond to the preset identifier 503 and the owner identifier 504 in the management table illustrated in FIGS. 5A to 5D. Here, after the user has entered the registration name and pressed the "next" button 721, the process advances to S803, where the CPU 211 displays a preset registration screen 730, illustrated in FIGS. 7B to 7H, in the operation unit 216. The processing of S803 to S810 that follows thereafter is processing for obtaining the details of settings for each of printing preset items selected by the user through preset registration screens 730, 740, 750, 760, 770, and 780, illustrated in FIGS. 7B to 7H.

In S803, the preset registration screen 730, for the case where a printing mode 731 has been selected, is displayed in the operation unit 216. Here, the printing mode selected by the user through the preset registration screen 730, namely color printing or black-and-white printing, is obtained. The printing mode setting value selected here corresponds to color print settings 505 in the management table illustrated in FIGS. 5A to 5D.

Next, when printed sides 741 is selected, the process advances to S804, where the CPU 211 displays the preset registration screen 740 in the operation unit 216. In this preset registration screen 740, single-sided or double-sided can be selected as the setting for the printed sides, and the CPU 211 obtains the setting value for the printed sides selected here. This setting value corresponds to printed side settings 506 in the management table.

Next, when Nup 751 is selected, the process advances to S805, where the CPU 211 displays the preset registration screen 750 in the operation unit 216. The CPU 211 then obtains Nup settings, which are set through the preset registration screen 750 and indicate how many printing pages are to be printed onto a single sheet at a reduced size. This setting value corresponds to Nup settings 507 in the management table.

Next, binding settings are made in S806 to S808. Here, the user can select whether stapleless binding or stapling is to be carried out for the binding process, as well as the binding positions and binding number. When binding 761 is selected, the process advances to S806, where the CPU 211 displays the preset registration screen 760 in the operation unit 216. Whether or not to carry out binding, and when carrying out binding, whether to carry out stapling or stapleless binding, can be selected through the preset registration screen 760. Furthermore, when binding is to be carried out, the binding position, e.g., upper-left, lower-left, upper-right, and lower-right, can be selected, and the CPU 211 obtains the setting values. This setting value corresponds to binding settings 508 in the management table. When stapling is selected in S806, the process advances to S807, where the CPU 211 obtains stapling, as selected by the user, and the binding position, after which the process advances to S809. On the other hand, when stapleless binding is selected in S806, the process advances to S808, where the CPU 211 obtains stapleless binding, as selected by the user, and the binding position, after which the process advances to S809. These setting values correspond to binding settings 508 in the management table. Although not illustrated in the flowchart, the process advances from S806 to S809 if the user has selected not to carry out binding.

Next, when punching 771 is selected, the process advances to S809, where the CPU 211 displays the preset registration screen 770 in the operation unit 216. Here, the user can specify whether or not to carry out punching, and when carrying out punching, the number and positions of the holes. The CPU 211 obtains the setting information set through the preset registration screen 770. The value set here corresponds to punching settings 509 in the management table.

Next, when folding 781 is selected, the process advances to S810, where the CPU 211 displays the preset registration screen 780 in the operation unit 216. Here, the user can set whether or not to carry out folding, as well as the type of the fold. In this manner, the CPU 211 obtains the information of the folding which has been set. The value set here corresponds to folding settings 510 in the management table.

Note that the processing from S803 to S810 can be cycled through freely during the settings by pressing tab buttons 731, 741, 751, 761, 771, and 781 in the preset registration screens. When the settings are complete and a save button 732 is pressed in the preset registration screen, the process advances to S811, where the CPU 211 carries out an exclusivity check among the set items. If the exclusivity check shows no problems, the process advances to S812, where the CPU 211 saves the setting values in the management table illustrated in FIGS. 5A to 5D (saves the values in the storage 214). Note that if the exclusivity check in S811 shows a problem, an indication to that effect is displayed as in a preset registration error screen 790. In response, the user redoes the settings by carrying out the processing of S803 to S810 again. This ensures that the user does not make an erroneous printing preset setting. Note that a confirmation screen, including an illustration or the like for confirming the final product to be printed, may be displayed before saving the details selected in S812. In this case, if the MFP 101 has received a user instruction indicating that the settings are OK through the confirmation screen, the process advances to S812. On the other hand, if the MFP 101 has received a user instruction indicating that the settings are to be redone, the process advances to S803, so that the various settings can be redone.

FIGS. 6A and 6B are diagrams for describing an example of a request to obtain capability information of the printing device and information pertaining to the printing preset identifier, and a response thereto, between the information processing device and the MFP 101 according to the first embodiment.

An obtainment request message 600 sent to the MFP 101 from an information processing device is for obtaining only the information pertaining to the identifier of a printing preset registered by the user of the information processing device that issued the request. As such, information pertaining to an owner identifier 601, which indicates the user of the information processing device as the owner of the printing preset, is included. This message 600 requests information pertaining to the identifier of a printing preset corresponding to an owner identifier of "suzuki".

A message 610 includes a printer capability response, as well as information pertaining to the identifier of a printing preset included in the capability response, and these are sent from the MFP 101 to the information processing device. 611 denotes a plurality of printing presets having a list structure, including identifiers 612 for individual printing presets, and owner information 613 of those printing presets. The message 610 is an example of the capability response to the message 600. In the message 610, three printing presets designated with the owner identifier of "suzuki" are registered in the MFP 101, and it can be seen that the identifiers of those printing presets are "estimate form", "application form", and "diagram".

A message 620 is an example of the data of the print job generated by the information processing device and sent to the MFP 101. Here, job attributes include a printing preset identifier 621 and a printing preset owner identifier 622.

Upon receiving this print job, the mobile job settings updating module 303 of the MFP 101 searches the printing preset saving module 304 using this printing preset identifier 621 as a search key, obtains the printing presets corresponding to the preset identifier 621 ("estimate form" here) having the owner identifier of "suzuki", and carries out the printing process.

For example, assuming that the management table illustrated in FIGS. 5A to 5D is registered, this estimate form is to be printed in color, as 1 in 1 on one side, with the upper-left of the printed sheet being bound through stapleless binding, and discharged without punching or folding.

Print settings in a generic printing service will be described next. FIG. 9 is a diagram for describing an example of a print settings screen displayed by the information processing device according to the first embodiment.

A screen 901 indicates a printing dialog called from an application in the information processing device. At the stage when the screen 901 is first displayed, a printer (MFP) to be used for the printing has not yet been selected, and thus no details are displayed for a printer display field 906, a printing preset identifier 902, and so on. Next, when the user presses a printer search button 903 in this screen, the screen transitions to a printing device selection screen 910. The information processing device sends a search packet, for searching out printing devices (MFPs) on the LAN 100 (S402 in FIG. 4), while this selection screen 910 is being displayed. Here, when the MFP 101 returns a response in S404 of FIG. 4, the information of the MFP 101 that returned the response to the information processing device (S404) is displayed in the screen of the information processing device. The screen 910 indicates an example of a case where three printing devices have been found. Here, 911 will be described as a printing device corresponding to the MFP 101, for explanatory purposes.

When the user selects one of the printing devices ("Printer (1)" here) through the selection screen 910, the screen returns to the screen 901, and the printer identifier "Printer (1)" is displayed in the printer display field 906. Additionally, a guidance button 904 for an identifier selection screen 920 is displayed on the basis of the information of the printing preset identifier received from the MFP 101 (S405/406). Then, when the guidance button 904 is pressed in the selection screen 901, the screen transitions to the screen 920, where a list 921 of printing preset identifiers that can be used by the selected printing device (MFP) is displayed.

Assuming that the user identifier is "suzuki", "estimate form" 521, "application form" 522, and "diagram" 524 are saved as printing presets having an owner identifier 504 of "suzuki" saved in the management table (FIGS. 5A to 5D) in the printing preset saving module 304. Accordingly, "estimate form", "application form", and "diagram" are displayed as indicated by the list 921 in the printing preset selection screen 920, using the preset identifiers.

Here, when the user selects (S407) a single printing preset identifier ("estimate form" here) in the printing preset selection screen 920, the screen in the information processing device returns to the screen 901. At this time, in the screen 901, the identifier of the selected printer, i.e., "Printer (1)", is displayed in the printer display field 906, and the printing preset of "estimate form" is displayed as well. If the user presses a print button 905 in this state, a print job in which the printing preset identifier is embedded is sent from the information processing device to the MFP 101 (S408). Then, in the MFP 101, that estimate form is printed in color, 1 in 1, and on one side, with the upper-left of the printed sheet bound through stapleless binding, and the sheet discharged with no punching and no folding.

Figure 10:
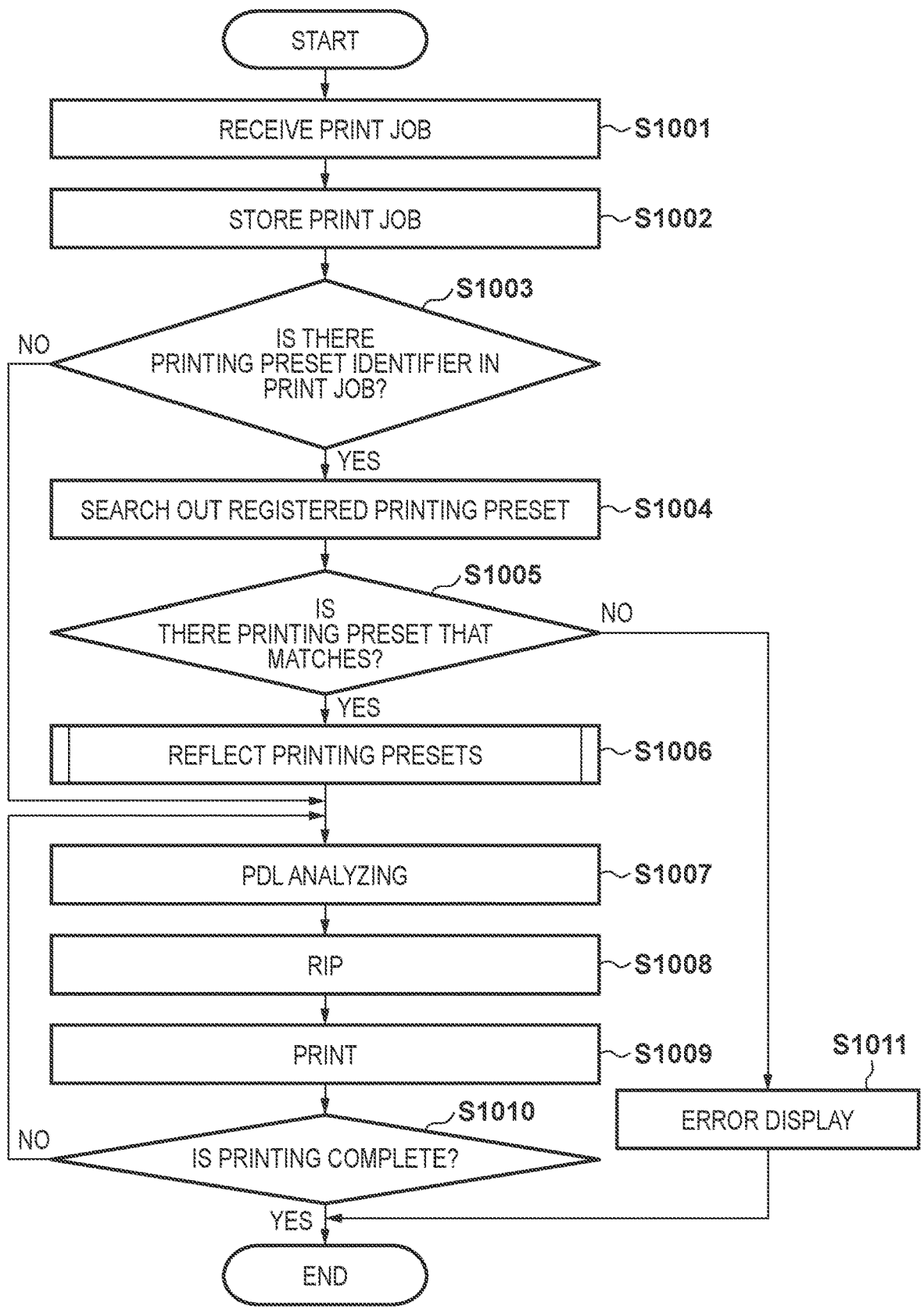
FIG. 10 is a flowchart for describing processing through which an MFP receives a print job and prints according to the first embodiment.

FIG. 10 is a flowchart for describing processing through which the MFP 101 receives a print job and prints according to the first embodiment. Note that the processing indicated in this flowchart is achieved by the CPU 211 executing programs deployed into the RAM 213. Accordingly, the following descriptions of FIG. 8 assume that the CPU 211 is the entity executing each step.

First, in S1001, the CPU 211 receives a print job sent from the information processing device, and saves the received print job in the storage 214 in S1002. The process then advances to S1003, where the CPU 211 analyzes the IPP header of that print job, and then determines whether or not a printing preset identifier is included. If it is determined that a printing preset identifier is included, the process advances to S1004, and if not, the process advances to S1007.

In S1004, the CPU 211 searches out a printing preset registered in the storage 214, e.g., registered in the management table illustrated in FIGS. 5A to 5D, on the basis of the printing preset identifier included in the print job and the owner identification information of the print job. The process then advances to S1005, where the CPU 211 determines whether or not a printing preset that matches the printing preset identifier included in the print job and the owner identification information of that print job is registered. If it is determined that a matching printing preset is registered, the process advances to S1006, but if not, the process advances to S1011, where error processing is carried out, after which the process ends. In this error processing, a message indicating that no corresponding printing preset is present is displayed in the operation unit 216, for example, and an error response is returned to the information processing device that sent the print job.

In S1006, the CPU 211 creates print setting information reflecting the matching printing preset. This process will be described later with reference to the flowchart in FIG. 11.

The process then advances to S1007, where the CPU 211 analyzes the PDL data included in the print job, and in S1008, a RIP process is carried out to expand the PDL data into bitmap data. The process then advances to S1009, where the expanded page data is output to the printing unit 220 and printed. In this printing process, the printing is carried out according to the printing specifications in which the printing preset has been reflected in S1006. The process then advances to S1010, where the CPU 211 determines whether or not the printing is complete for the final page; if the printing is not complete, the process returns to S1007, and the above-described processing is repeated. The process ends when the printing of the print data specified in the print job is complete. Note that if post-processing such as a binding process, a punching process, a folding process, or the like is set for the printed product, it is assumed that the CPU 211 executes the post-processing for the printed sheets in addition to the printing process in S1009. In this case, the CPU 211 executes the post-processing on the sheets in tandem with the printing unit 220 and the sheet processing unit 222.

Figure 11:
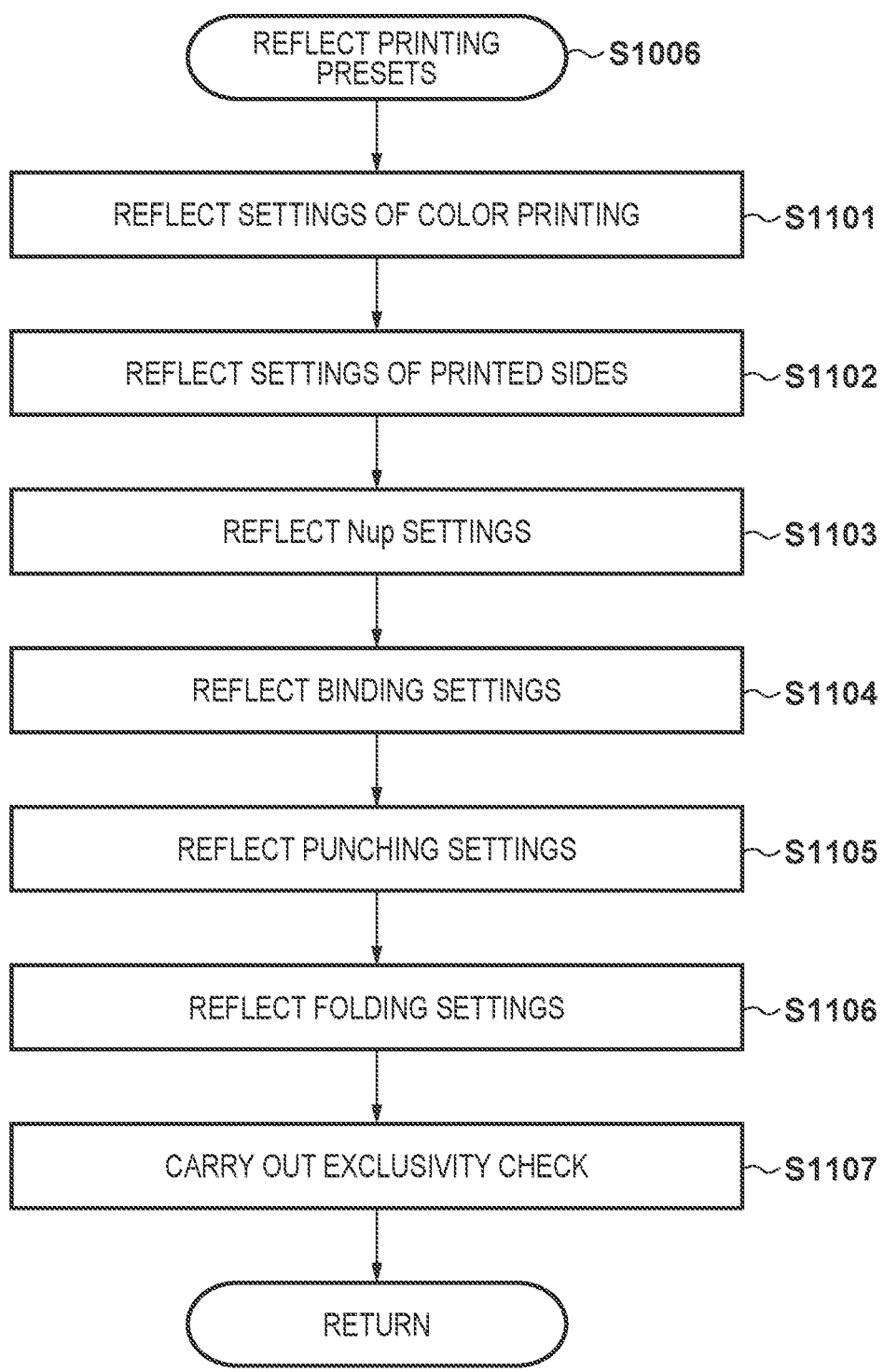
FIG. 11 is a flowchart for describing processing for reflecting a printing preset in print data, carried out in S1006 of FIG. 10.

FIG. 11 is a flowchart for describing processing for reflecting the printing preset in the print data, carried out in S1006 of FIG. 10.

First, in S1101, the CPU 211 causes color print settings 505 (FIGS. 5A to 5D), which correspond to the owner identification information and the printing preset identifier, to be reflected. For example, if the above-described printing preset identifier is "estimate form" and the owner identification information is "suzuki", "color" is set, according to FIGS. 5A to 5D. The process then advances to S1102, where the CPU 211 causes printed side settings 506, which correspond to the owner identification information and the printing preset identifier, to be reflected. For example, if the above-described printing preset identifier is "estimate form" and the owner identification information is "suzuki", "single-sided" is set, according to FIGS. 5A to 5D. The process then advances to S1103, where the CPU 211 causes Nup settings 507, which correspond to the owner identification information and the printing preset identifier, to be reflected. For example, if the above-described printing preset identifier is "estimate form" and the owner identification information is "suzuki", "1 in 1" is set, according to FIGS. 5A to 5D. The process then advances to S1104, where the CPU 211 causes binding settings 508, which correspond to the owner identification information and the printing preset identifier, to be reflected. For example, if the above-described printing preset identifier is "estimate form" and the owner identification information is "suzuki", "stapleless binding" is set, with a binding position of "upper-left", according to FIGS. 5A to 5D. The process then advances to S1105, where the CPU 211 causes punching settings 509, which correspond to the owner identification information and the printing preset identifier, to be reflected. For example, if the above-described printing preset identifier is "estimate form" and the owner identification information is "suzuki", "no punching" is set, according to FIGS. 5A to 5D. The process then advances to S1106, where the CPU 211 causes folding settings 510, which correspond to the owner identification information and the printing preset identifier, to be reflected. For example, if the above-described printing preset identifier is "estimate form" and the owner identification information is "suzuki", "no folding" is set, according to FIGS. 5A to 5D. Lastly, the process advances to S1107, where the CPU 211 checks whether any conflicts have arisen due to the combination of the IPP job setting values and the setting values overwritten by the printing presets, such as the number of copies to be printed; and if there are no problems, the settings are overwritten with the updated print settings and saved in the storage 214. If a conflict has arisen here, an indication to that effect may be displayed in the operation unit 216, communicated to the information processing device that sent the job, or the like.

According to the present first embodiment as described thus far, the user registers a printing preset in the MFP 101 in advance, and the identifier of the registered printing preset is communicated, along with IPP protocol printer capability information, to the information processing device being operated by the user. As a result, the user of the information processing device can carry out printing in which the printing preset is reflected in the print job, without making complicated printing preset settings, simply by selecting the identifier of the printing preset from a UI screen and instructing the printing to be carried out. As a result, a printed product having complex printing specifications can be obtained even from a mobile terminal such as the tablet 103, the smartphone 104, or the like.

A second embodiment of the present invention will be described next. The foregoing first embodiment describes a case where the identifier of a printing preset is communicated to an information processing device as IPP protocol printer capability information. In the second embodiment, in addition to the identifier of the printing preset, the MFP 101 communicates information indicating print settings corresponding to that preset, illustrated as examples in FIGS. 5A to 5D (also called "printing attributes"), to the information processing device. When the printing preset identifier is selected from the printing dialog, the information processing device reflects information of the details of that preset in the current print settings. In other words, the printing system according to the second embodiment provides a configuration in which, when a user operation for selecting a preset has been accepted through the printing dialog, the details corresponding to the preset are reflected in the print settings screen on the information processing device side. This processing makes it possible to confirm the details of the printing preset from the printing dialog in the information processing device. Note that in the second embodiment, the hardware configurations of the prerequisite devices are the same as in the first embodiment. Detailed descriptions of configurations identical to those in the first embodiment will be omitted.

A specific control method according to the second embodiment will be described next. When sending the capability response indicated by S404 in FIG. 4, which includes the configuration information and the identification information, to the information processing device, the MFP 101 sends a capability response to which the print settings (also called "printing attributes") corresponding to the identification information of the preset have been added. The differences between the capability response according to the first embodiment and the capability response according to the second embodiment will be described using FIGS. 6A and 6B.

The MFP 101 according to the second embodiment communicates, to the information processing device, a printing preset including the printing attributes for each preset illustrated in FIGS. 5A to 5D, in addition to the printing preset identifiers 612 and the printing preset owner information 613. In other words, attributes corresponding to 521 in FIGS. 5A to 5D, namely "color, 1 in 1, single-sided printing, stapleless binding in the upper-left of the sheet", are added to the printing preset having a name of "estimate form". Likewise, attributes corresponding to 522 in FIGS. 5A to 5D, namely "black-and-white, 2 in 1, double-sided printing", are added to the printing preset having a name of "application form". Furthermore, attributes corresponding to 524 in FIGS. 5A to 5D, namely "black-and-white, 1 in 1, single-sided printing, two points binding on the left of the sheet, z-folding", are added to the printing preset having a name of "diagram".

A process for reflecting the settings in a case where the information processing device has accepted a user operation for selecting a preset through the printing dialog will be described next using FIG. 12.

Figure 12:
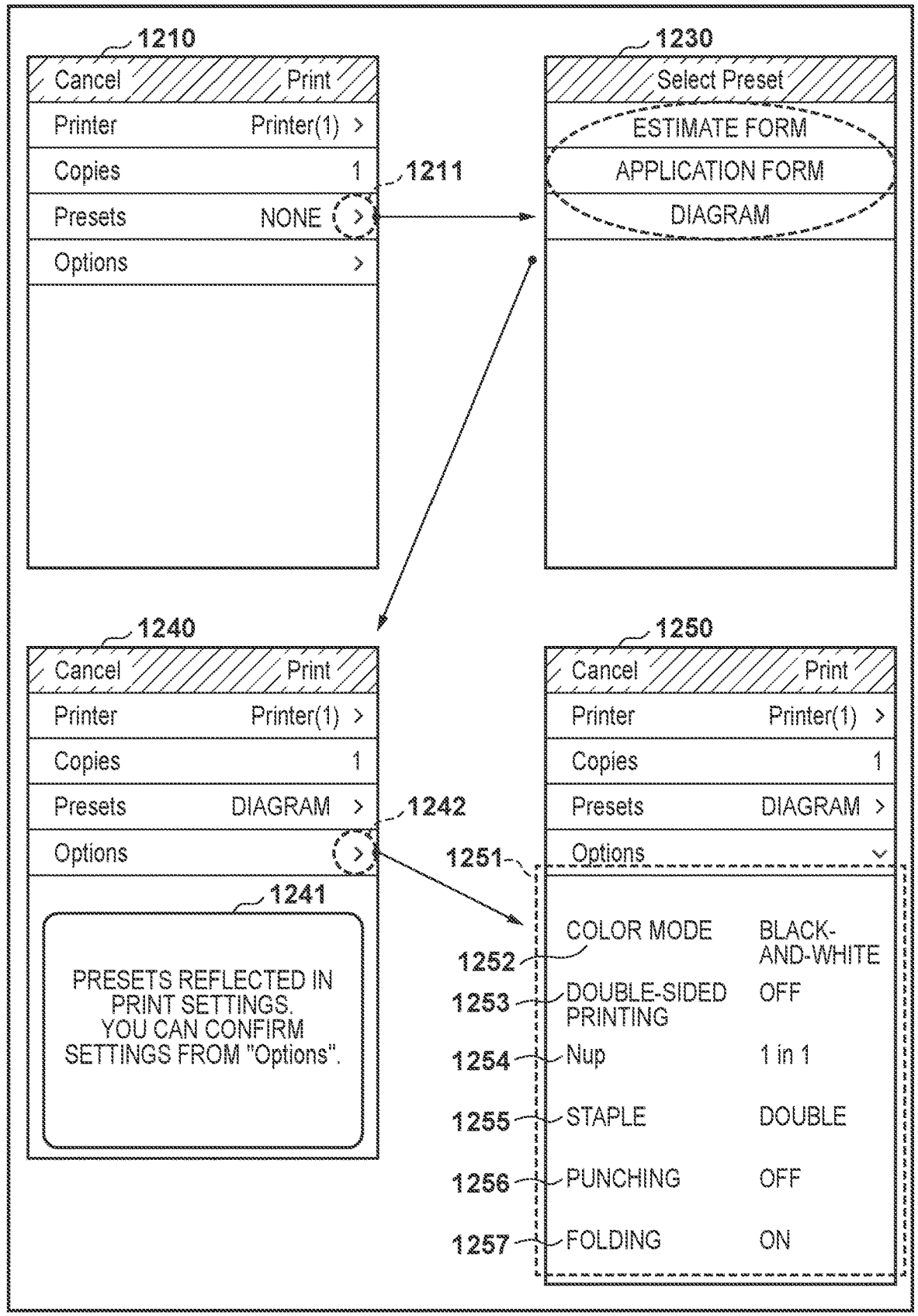
FIG. 12 depicts a view illustrating an example of a print settings screen displayed by an information processing device according to a second embodiment.

FIG. 12 depicts a view illustrating an example of a screen displayed in an operation unit of the information processing device 103, 104, or the like by the processor of the information processing device. A screen 1210 indicates a printing dialog called from an application in the information processing device. The printer search, the processing carried out when the print button is pressed, and so on are the same as the processing described in the first embodiment with reference to FIG. 9, and thus will not be described here. Here, for explanatory purposes, a case where "Printer (1)" has been selected through a user operation but no printing preset has been selected will be described as an example.

When a printer is selected through a user operation, the processor of the information processing device displays a guidance button 1211 in the screen 1210. When the guidance button 1211 is selected through a user operation, the processor of the information processing device transitions the screen displayed in the operation unit of the information processing device to a screen 1230. The screen 1230 is a screen similar to the screen 910 according to the first embodiment, and is a screen for selecting a preset to be used from among a list of presets. When a user operation for selecting one of the items from the list of presets displayed in the screen 1230 has been accepted, the processor of the information processing device transitions the screen displayed in the operation unit of the information processing device to a screen 1240. Here, a case where "diagram" has been selected from the list will be described as an example, for explanatory purposes. The processor of the information processing device changes the print settings displayed in the printing dialog on the basis of the attributes corresponding to the "diagram" printing preset, i.e., "black-and-white, 1 in 1, single-sided printing, two points binding on the left of the sheet, z-folding".

Returning to the descriptions of FIG. 12, the processor of the information processing device displays information 1241, indicating that the print settings based on the preset have been applied, in the screen 1240. The information 1241 is displayed for a predetermined amount of time (e.g., 5 seconds) after transitioning to the screen 1240. Once the predetermined amount of time has passed, the processor fades the display of the information 1241 out from the screen 1240.

An options button 1242 is a button used when confirming and changing the current print settings. When the options button 1242 is selected through a user operation, the processor of the information processing device transitions the screen displayed in the operation unit of the information processing device to a settings screen 1250. A region 1251 in the settings screen 1250 is a region for confirming and changing the current print settings. Here, print settings to which the "diagram" printing preset has been applied are shown as an example. As a result of the above-described application process, a color mode setting 1252 has been set to black-and-white, and a double-sided print setting 1253 has been set to off. A Nup setting 1254 is set to 1 in 1, and a binding setting 1255 is set to "double", indicating two points binding. Furthermore, a punching setting 1256 is set to off, and a folding setting 1257 is set to on.

In this manner, the second embodiment makes it possible to provide a configuration in which the details of a preset selected by the user are applied to the print settings, and the user can confirm the preset setting details. The printing process carried out after the preset has been selected is the same as in S407 to S410 in FIG. 4, described in the first embodiment, and that process will thus not be described here.

The second embodiment describes a configuration where the print settings applied on the basis of the printing preset selected by a user operation made through the region 1251 can be changed as an example; however, the configuration is not limited thereto. For example, when a printing preset is selected, the information processing device may prohibit the print settings from being changed. Additionally, attribute information indicating whether or not to permit changes to the settings can be provided for each printing preset. For example, if an attribute that cannot be interpreted by the print service (e.g., stapleless binding) has been set as an attribute for the printing preset, the CPU 211 of the MFP 101 stores the printing preset along with added information indicating that the settings are not permitted to be changed. A printing preset including this information is also sent for the capability response to the information processing device.

In this case, the processor of the information processing device prohibits the settings from being changed through the region 1251 when a printing preset is designated and a setting is made that does not permit changes to the settings made in that printing preset. Through this processing, situations where settings are changed on the printing service side can be suppressed in cases such as where an attribute with which the printing service of the information processing device is not compliant is set in the printing preset. Additionally, in this case, information indicating that the settings in that printing preset are prohibited from being changed may be displayed in addition to the information 1241. On the other hand, the processor of the information processing device carries out control so as to accept changes to the settings through the region 1251 when a printing preset is designated and a setting is made for permitting changes to the settings in the preset.

Variations

The foregoing embodiments describe an example in which printing can be carried out using a user's desired print settings, even from a generic printing service, by registering printing presets and identifiers thereof in an MFP in advance. However, the present invention is not limited thereto. For example, with an MFP having a hot folder provided with print settings (a shared folder for holding print jobs provided by the MFP), a "folder name" of the hot folder may be sent to an identifier for the capability response of the printer, included in the message 610 illustrated in FIG. 6A. In this case, upon determining that a print job received through IPP includes a hot folder identifier, the MFP stores the received print job in the hot folder specified by the identifier. The MFP may then overwrite the print settings of the print job with the print settings set in the hot folder in which the print job is stored, and then execute the printing process according to S1007 and on.

Furthermore, the foregoing embodiments describe an example in which, when the printer capabilities are communicated with a generic printing service as described with reference to S402 to S404 in FIG. 4, the printing preset is narrowed down on the basis of the owner identification information received from the generic printing service in S402. However, the present invention is not limited thereto. For example, a printer capability response including the identifiers of all of the registered printing presets may be returned. In this case, to suppress a situation in which many printing presets are displayed in the printing preset selection screen 920 illustrated in FIG. 9, a limit (e.g., an upper limit of 10) may be provided for the number of printing presets that can be stored in the MFP, for example.

This can also be applied in a case where the owner identification information sent by the generic printing service differs from the user identification information registered in the printing preset (the information for identifying the user of the MFP). In this case, an administrator of the MFP registers a correspondence relationship between the owner identification information sent by the generic printing service and the identification information of the user using the MFP 101 through a user management screen, which is not shown. The correspondence relationship registered through the user management screen is stored in a user DB, a table, or the like. In this case, the generic printing service sends a unique identifier indicating the information processing device (e.g., a device serial number, a wireless LAN MAC address, or the like) instead of the owner identification information that is sent to the MFP in S402, S413, and so on. By using the correspondence relationship stored in a user DB, a table, or the like in the processing of S403, S415, or the like, the MFP 101 specifies the user of the MFP 101 associated with the unique identifier received from the information processing device. The MFP 101 then returns a list of printing preset identifiers, which have been registered by the specified user, to the information processing device.

Note that the generic printing service described in the foregoing embodiments assumes a printing service compliant with IPP, a printing service based on the IPP specifications but having a proprietary extension, or the like, for example. For example, the present invention can be applied in a generic printing application, printing service, or the like preinstalled in the OS of the information processing device. Additionally, the present invention can be applied in a printing service, a printing application, or the like that supports printing devices from multiple vendors, for example.

The foregoing embodiments describe, as an example, a case where when the MFP 101 has received a print job including a printing preset identifier, the print settings of the print job are overwritten with the corresponding attributes in the printing preset; however, the present invention is not limited thereto. A configuration is also possible in which the corresponding attributes and the printing preset are compared with the print settings included in the received print job, after which the print settings can be overwritten. For example, if single-sided printing is set as an attribute in the printing preset selected by the user, but double-sided printing has been explicitly designated through the printing dialog, control can be carried out to prioritize the double-sided printing designated by the user. In this case, in the application process described in S1101 to S1106, if the print job includes print settings that are explicitly designated, those print settings may be prioritized.

According to the present embodiment, a printed product to which complex print settings have been applied can be obtained, without sacrificing the operability of printing from a communication terminal such as a mobile device.

According to the present embodiments, there is an effect in that a printed product to which complex setting information has been applied can be obtained, even when printing through a generic printing service from an information processing device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:
a controller including a processor, the controller configured to:
register a value of a print setting item in association with an identifier;
transmit the registered identifier to an information processing apparatus, wherein the transmitted identifier is displayed by the information processing apparatus on a print setting screen that does not include an area for setting the value of the print setting item;
receive print data generated by the information processing apparatus that displays the print setting screen in which the transmitted identifier is selected; and
process the received print data with the value registered in association with the selected identifier.

2. The image forming apparatus according to claim 1, wherein the controller is further configured to transmit, to the information processing apparatus, the registered value of the print setting item with the identifier.

3. The image forming apparatus according to claim 2, wherein the transmitted value is able to be displayed by the information processing apparatus while the transmitted identifier is selected.

4. The image forming apparatus according to claim 2, wherein the transmitted value is displayed by the information processing apparatus based on a user instruction received in a situation that the transmitted identifier is selected.

5. The image forming apparatus according to claim 2, wherein the controller is further configured to:
process the received print data with another value of the print setting item included in the received print data, wherein the transmitted value has been changed to the another value based on a user instruction received from the information processing apparatus.

6. The image forming apparatus according to claim 1, wherein the received print data includes the selected identifier.

7. The image forming apparatus according to claim 1, wherein the controller is further configured to:
receive a user instruction for registering the value of the print setting item in association with the identifier; and
register the value of the print setting item in association with the identifier.

8. The image forming apparatus according to claim 1, wherein the identifier is input by a user.

9. The image forming apparatus according to claim 1, wherein the controller is further configured to notify that a plurality of values set for registering in association with the identifier are conflicted.

10. The image forming apparatus according to claim 9, wherein the controller is further configured to determine whether or not the plurality of values are conflicted, and notify, based on a result of the determination, that the plurality of values set for registering in association with the identifier are conflicted.

11. An image forming apparatus comprising a controller including a processor, the controller configured to:
register a value of a print setting item in association with an identifier;
transmit the registered identifier to an information processing apparatus, wherein the transmitted identifier is displayed by the information processing apparatus on a print setting screen that does not include an area for setting the value of the print setting item;

receive print data generated based on a user instruction from the information processing apparatus, wherein the user instruction was received by the information processing apparatus that displays the print setting screen in which the transmitted identifier is selected; and process the received print data with the value registered in association with the selected identifier.

12. The image forming apparatus according to claim 11, wherein the controller is further configured to transmit, to the information processing apparatus, the registered value with the identifier, wherein the transmitted value is able to be displayed by the information processing apparatus while the transmitted identifier is selected.

13. An image forming apparatus comprising:

a storage;

a controller including a processor, the controller configured to:

register a value of a print setting item in association with an identifier, wherein the storage stores identifiers including the registered identifier;

transmit the stored identifiers to an information processing apparatus, wherein the transmitted identifiers are displayed on a print setting screen by the information processing apparatus;

receive print data generated by the information processing apparatus that displays the print setting screen in which the registered identifier is selected;

process the received print data with the value registered in association with the selected identifier, wherein the controller processes the print data generated by the information processing apparatus that displays the print setting screen in which none of the transmitted identifiers is selected without the value registered in association with the identifier.

14. The image forming apparatus according to claim 13, wherein the received data include the selected identifier.

15. The image forming apparatus according to claim 13, wherein the controller is further configured to transmit the registered value with the identifier.

16. The image forming apparatus according to claim 15, wherein the transmitted value is able to be displayed by the information processing apparatus while the identifier is selected.

17. The image forming apparatus according to claim 15, wherein the transmitted value is displayed by the information processing apparatus based on a user instruction received in a situation that the transmitted identifier is selected.

18. The image forming apparatus according to claim 13, wherein the controller is further configured to notify that a plurality of values set for registering in association with the identifier are conflicted.

19. The image forming apparatus according to claim 18, wherein the controller is further configured to determine whether the plurality of values are conflicted, and notify, based on a result of the determination, that the plurality of values set for registering in association with the identifier are conflicted.

20. A method for controlling an image forming apparatus, the method comprising:

registering a value of a print setting item in association with an identifier;

transmitting the registered identifier to an information processing apparatus, wherein the transmitted identifier is displayed by the information processing apparatus on a print setting screen that does not include an area for setting the value of the print setting item;

receiving print data from the information processing apparatus, wherein the print data is generated based on a user instruction received from the information processing apparatus that displays the print setting screen in which the transmitted identifier is selected; and processing the received print data with the value registered in association with the selected identifier.

* * * * *